United States Patent
Kwon et al.

(10) Patent No.: US 12,019,814 B2
(45) Date of Patent: Jun. 25, 2024

(54) ELECTRONIC DEVICE AND ELECTRONIC PEN FOR INPUT CONTROL AND METHOD THEREOF

(71) Applicant: SAMSUNG ELECTRONICS CO., LTD., Suwon-si (KR)

(72) Inventors: Banghyun Kwon, Suwon-si (KR); Inhyung Jung, Suwon-si (KR); Hyunwoong Kwon, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/887,208

(22) Filed: Aug. 12, 2022

(65) Prior Publication Data

US 2023/0051874 A1   Feb. 16, 2023

Related U.S. Application Data

(63) Continuation of application No. PCT/KR2022/011854, filed on Aug. 9, 2022.

(30) Foreign Application Priority Data

Aug. 10, 2021   (KR) .................. 10-2021-0105251

(51) Int. Cl.
  *G06F 3/038*   (2013.01)
  *G06F 3/0354*  (2013.01)
  *G06F 3/046*   (2006.01)

(52) U.S. Cl.
  CPC ........ *G06F 3/0383* (2013.01); *G06F 3/03545* (2013.01); *G06F 3/046* (2013.01);
  (Continued)

(58) Field of Classification Search
  CPC .... G06F 3/0383; G06F 3/03545; G06F 3/046; G06F 2203/0384; G06F 2203/04101; G06F 3/017
  See application file for complete search history.

(56) References Cited

U.S. PATENT DOCUMENTS 5,969,712 A * 10/1999 Morita ................ G06F 3/03545
                                              715/810
10,365,732 B2 * 7/2019 Bernstein ............. G06F 3/0482
(Continued)

FOREIGN PATENT DOCUMENTS

KR   10-2014-0026966   3/2014
KR   10-2015-0050288   5/2015
(Continued)

OTHER PUBLICATIONS

Search Report dated Nov. 17, 2022 in corresponding International Patent Application No. PCT/KR2022/011854.
(Continued)

*Primary Examiner* — Benyam Ketema
(74) *Attorney, Agent, or Firm* — Nixon & Vanderhye, P.C.

(57) ABSTRACT

An example electronic device according to various embodiments may include a display, a wireless communication circuit and at least one processor operatively coupled with the display and the wireless communication circuit, and the at least one processor may be configured to receive motion sensor values from an external electronic device through the wireless communication circuit, count the number of approach indicators received together with the motion sensor values, and discard the received motion sensor values when the number exceeds a threshold value.

15 Claims, 15 Drawing Sheets

(52) U.S. Cl.
CPC ............... *G06F 2203/0384* (2013.01); *G06F 2203/04101* (2013.01)

(56) References Cited

U.S. PATENT DOCUMENTS

| | | | |
|---|---|---|---|
| 10,509,492 B2* | 12/2019 | Zhang | G06F 3/04897 |
| 2008/0238887 A1* | 10/2008 | Love | G06F 3/03545 |
| | | | 345/179 |
| 2014/0055426 A1* | 2/2014 | Park | G06F 3/03545 |
| | | | 345/179 |
| 2016/0124528 A1* | 5/2016 | Feng | G06F 3/03545 |
| | | | 345/179 |
| 2016/0139690 A1* | 5/2016 | Chang | G06F 3/0338 |
| | | | 345/179 |
| 2017/0322642 A1* | 11/2017 | Zhang | G06F 3/0484 |
| 2017/0344174 A1* | 11/2017 | Pant | G06F 3/041661 |
| 2019/0042006 A1* | 2/2019 | Hsieh | G06F 3/017 |
| 2020/0249773 A1* | 8/2020 | Lee | G06F 3/038 |
| 2020/0249774 A1* | 8/2020 | Jung | G06F 3/03545 |
| 2021/0124439 A1* | 4/2021 | Yeom | G06F 3/04162 |
| 2023/0067179 A1* | 3/2023 | Kim | H02J 50/12 |
| 2023/0154500 A1* | 5/2023 | Oh | H04N 21/439 |
| | | | 386/201 |
| 2023/0161673 A1* | 5/2023 | Choi | G06F 9/46 |
| | | | 714/6.3 |
| 2023/0176665 A1* | 6/2023 | Jung | G06F 3/0346 |
| | | | 345/179 |
| 2023/0269801 A1* | 8/2023 | Bhargava | H04W 84/18 |
| | | | 455/39 |

FOREIGN PATENT DOCUMENTS

| | | |
|---|---|---|
| KR | 10-2016-0047385 | 5/2016 |
| KR | 10-2017-0139141 | 12/2017 |
| KR | 10-2019-0070162 | 6/2019 |

OTHER PUBLICATIONS

Written Opinion dated Nov. 17, 2022 in corresponding International Patent Application No. PCT/KR2022/011854.

* cited by examiner

ELECTRONIC DEVICE AND ELECTRONIC PEN FOR INPUT CONTROL AND METHOD THEREOF

CROSS-REFERENCE TO RELATED APPLICATIONS

This application is a continuation of International Application No. PCT/KR2022/011854 designating the United States, filed on Aug. 9, 2022, in the Korean Intellectual Property Receiving Office and claiming priority to Korean Patent Application No. 10-2021-0105251, filed on Aug. 10, 2021, in the Korean Intellectual Property Office, the disclosures of which are incorporated by reference herein in their entireties.

FIELD

Background

The disclosure relates to an electronic device and a method for controlling inputs using an electronic pen thereof.

Description of Related Art

An electronic device may receive user inputs through a touch screen, and an additional input device (for example, an electronic pen) may be provided such that a user can make more precise touch inputs or hover inputs. The electronic pen may be mounted in an internal or external space of the electronic device, or may be provided as a separate component.

The electronic device may not only display visual effects related to touch inputs on the screen, but also display visual effects related to inputs using the electronic pen on the screen. For example, the electronic device may display a graphic object (for example, pen pointer) in response to an input using the electronic pen or may delete the same, thereby providing user convenience.

Recent electronic pens have evolved to provide input functions by transmitting motion information to electronic devices through a short-range wireless communication technology (for example, Bluetooth or Bluetooth low energy (BLE)) in addition to input functions through touch inputs or hover inputs with regard to electronic devices.

SUMMARY

Embodiments of the disclosure may provide an electronic device and an electronic pen thereof, wherein an appropriate control method is provided in connection with inputs through touch inputs or hover inputs using the electronic pen with regard to the electronic device, and inputs of motion information through a short-range wireless communication technology.

An electronic device according to various embodiments disclosed herein may include a display, a wireless communication circuit, and at least one processor operatively coupled with the display and the wireless communication circuit, wherein the at least one processor is configured to receive motion sensor values from an external electronic device through the wireless communication circuit, count a number of approach indicators received along with the motion sensor values, and discard the received motion sensor values based on the number of received approach indicators exceeding a threshold value.

A method of an electronic device according to various embodiments disclosed herein may include receiving motion sensor values from an external electronic device, determining whether a threshold value is exceeded by counting a number of approach indicators received along with the motion sensor values, and discarding the received motion sensor values based on the number of received approach indicators exceeding a threshold value.

An electronic device according to various embodiments disclosed herein may include a motion sensor, an electromagnetic sensor, a wireless communication circuit, and a processor operatively coupled with the motion sensor, the electromagnetic sensor, and the wireless communication circuit, wherein the processor is configured to receive a motion sensor value from the motion sensor, generate an approach indicator based on a sensor signal greater than or equal to a specified threshold value being received through the electromagnetic sensor at a time of receiving the motion sensor value, and transmit the approach indicator along with the motion sensor value to an external electronic device through the wireless communication circuit.

Various embodiments may provide an appropriate control method in connection with data inputs through touch inputs or hover inputs using an electronic pen with regard to an electronic device, and inputs of motion information through a short-range wireless communication technology.

Various embodiments may provide an appropriate control method in connection with data inputs through touch inputs or hover inputs using an electronic pen with regard to one of multiple electronic devices, and inputs of motion information through a short-range wireless communication technology with regard to another electronic device.

Various other advantageous effects identified explicitly or implicitly through the disclosure may be provided.

BRIEF DESCRIPTION OF THE DRAWINGS

With respect to the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which.

DETAILED DESCRIPTION

Figure 1:
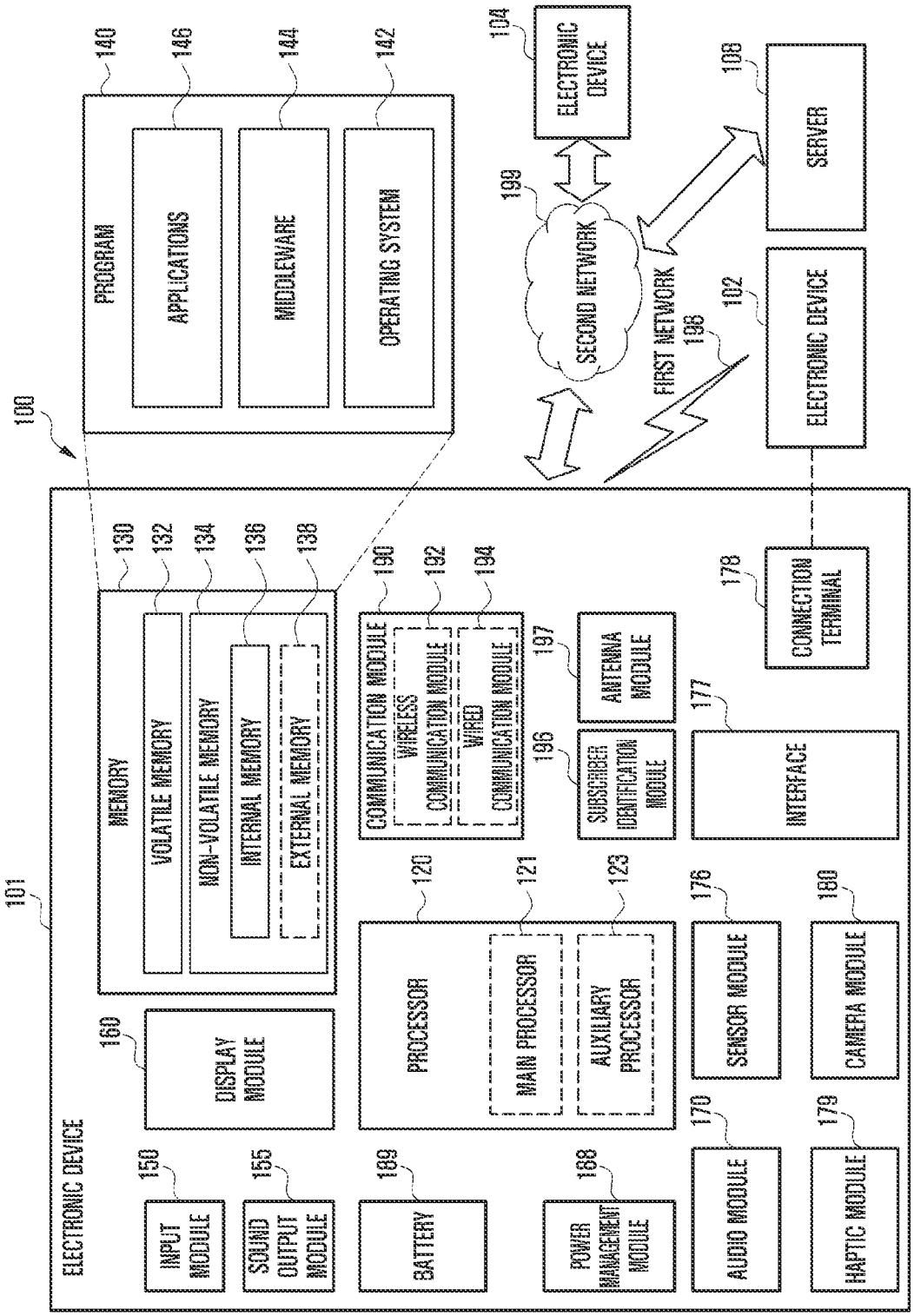
FIG. 1 is a block diagram of an example electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (1-D-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
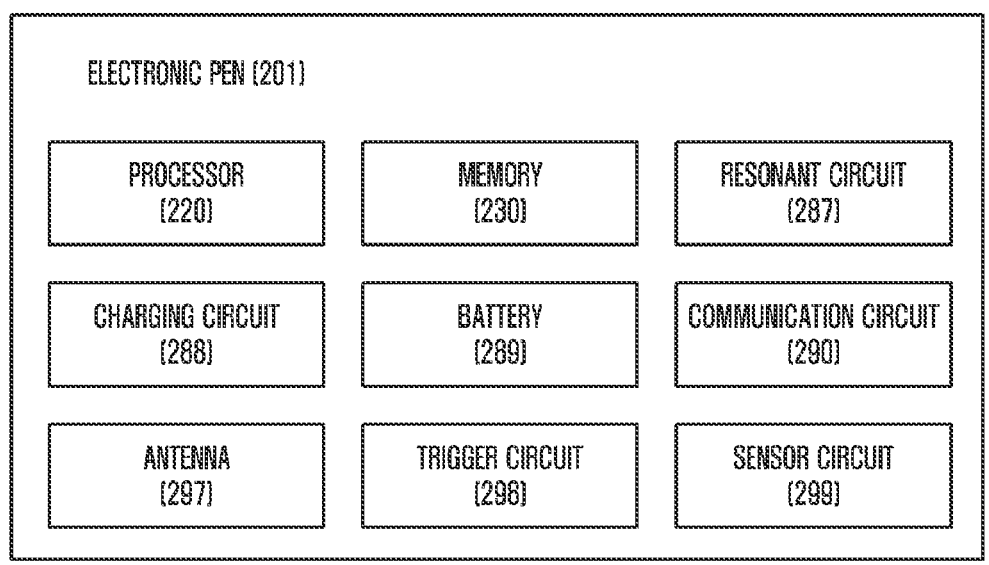
FIG. 2 is a block diagram illustrating an example electronic pen according to various embodiments.

FIG. 2 is a block diagram illustrating an example electronic pen according to various embodiments.

Referring to FIG. 2, the electronic pen 201 according to an embodiment may include a pen processor 220, a memory 230, a resonant circuit 287, a charging circuit 288, a battery 289, a communication circuit 290, an antenna 297, a trigger circuit 298 and/or a sensor circuit 299. In some embodiments, the pen processor 220, at least a portion of the resonant circuit 287, and/or at least a portion of the communication circuit 290 may be configured on a printed circuit board or in the form of a chip. The pen processor 220, the resonant circuit 287, and/or the communication circuit 290 may be electrically connected to the memory 230, the charging circuit 288, the battery 289, the antenna 297, the trigger circuit 298, and/or the sensor circuit 299. The electronic pen 201 according to an embodiment may include only the resonance circuit 287 and a button.

The pen processor 220 may include a customized hardware module or a generic processor configured to execute software (e.g., application programs). The pen processor 220 may include a hardware component (function) or a software component (program) including at least one of various sensors included in the electronic pen 201, a data measurement module, an input/output interface, and a module managing the state or environment of the electronic pen 201, or a communication module. The pen processor 220 may include, for example, one or a combination of two or more of hardware, software, or firmware.

According to an embodiment, the pen processor 220 may be configured to transmit information (e.g., information related to the location of the electronic pen 201) calculated based on information indicating a pressed state of the button, sensing information obtained by the sensor circuit 299, and/or sensing information, to the electronic device 101 through the communication circuit 290.

The resonant circuit 287 may include a coil (or an inductor) and/or a capacitor. The resonance circuit 287 may resonate based on an electromagnetic field signal generated from a digitizer (e.g., the display module 160 of FIG. 1) of the electronic device 101, and may radiate an electromagnetic resonance (EMR) input signal (or magnetic field) by resonance. In a case in which the electronic pen 201 transmits a signal by the EMR method, the electronic pen 201 may generate a signal having a resonant frequency based on an electromagnetic field generated from an inductive panel of the electronic device 101. In a case in which the electronic pen 201 transmits a signal using an active electrostatic (AES) method, the electronic pen 201 may generate a signal using capacity coupling with the electronic device 101. In a case in which the electronic pen 201 transmits a signal by an electrically coupled resonance (ECR) method, the electronic pen 201 may generate a signal having a resonant frequency based on an electric field generated from a capacitive device of the electronic device.

The electronic device 101 may identify the position of the electronic pen 201 on the electronic device 101 using the electromagnetic resonance input signal. For example, the electronic device 101 may identify the position of the electronic pen 201 based on the magnitude of the induced electromotive force (e.g., output current) generated by the electromagnetic resonance input signal in each of a plurality of channels (e.g., a plurality of loop coils) in the digitizer. In the above description, the electronic device 101 and the electronic pen 201 have been described as operating based on the EMR method, but this operation is merely provided as an example, and the electronic device 101 may generate a signal based on an electric field based on an electrically coupled response (ECR) method. The resonance circuit of the electronic pen 201 may be resonated by an electric field. The electronic device 101 may identify potentials at a plurality of channels (e.g., electrodes) due to resonance in the electronic pen 201, and may identify the position of the electronic pen 201 based on the potentials. The electronic pen 201 may be implemented in an active electrostatic (AES) method, and those skilled in the art will understand that there is no limitation on the type of implementation thereof.

According to an embodiment, the resonance circuit 287 may be used to change the intensity of an electromagnetic field or a frequency according to an operation state of a user. For example, the resonance circuit 287 may provide various frequencies for recognizing a hovering input, a drawing input, a button input, or an erasing input. For example, the resonance circuit 287 may provide various resonant frequencies according to a connection combination of a plurality of capacitors, or may provide various resonant frequencies based on a variable inductor and/or a variable capacitor.

The memory 230 may store information related to the operation of the electronic pen 201. For example, the information may include information for communication with the electronic device 101 and frequency information related to an input operation of the electronic pen 201. In addition, the memory 230 may store programs (or applications, algorithms, or processing loops) for calculating information (e.g., coordinate information, and/or displacement information) on the location of the electronic pen 201 from sensing data of the sensor circuit 299. The memory 230 may store a communication stack of the communication circuit 290. According to an implementation, the communication circuit 290 and/or the pen processor 220 may include a dedicated memory.

The communication circuit 290 may be configured to perform a wireless communication function between the electronic pen 201 and the communication module 190 of the electronic device 101. According to an embodiment, the communication circuit 290 may transmit state information, input information, and/or information related to the location of the electronic pen 201 to the electronic device 101 using, for example, a near field communication method. For example, the communication circuit 290 may transmit direction information (e.g., motion sensor data) of the electronic pen 201 obtained through the sensor circuit 299, voice information input through a microphone, or remaining charge amount information of the battery 289 to the electronic device 101. For example, the communication circuit 290 may transmit sensing data obtained from the sensor circuit 299 and/or information related to the location of the electronic pen 201 identified based on sensing data to the electronic device 101. For example, the communication circuit 290 may transmit information on the state of a button included in the electronic pen 201 obtained through the trigger circuit 298 to the electronic device 101. For example, the near field communication method may include at least one of Bluetooth, Bluetooth low energy (BLE) NFC, Wi-Fi direct, or wireless LAN, but there is no limitation on the type of near field communication.

The antenna 297 may be used to transmit a signal or power to the outside (e.g., to the electronic device 101) or to receive a signal(s) or power from the outside. According to an embodiment, the electronic pen 201 may include a plurality of antennas 297, and among them, at least one antenna 297 suitable for a communication method may be selected. Through the at least one selected antenna 297, the communication circuit 290 may exchange signals or power with an external electronic device.

The trigger circuit 298 may include at least one button. According to an embodiment, the trigger circuit 298 may transmit a trigger signal to the electronic device 101 using an input signal of a button.

According to an embodiment, the pen processor 220 may identify the input method (e.g., touch or press) or type (e.g., EMR button or BLE button) of the button of the electronic pen 201 based on the received trigger signal.

The sensor circuit 299 may generate an electrical signal or data value corresponding to an internal operating state or an external environmental state of the electronic pen 201. For example, the sensor circuit 299 may include at least one of a motion sensor, a remaining battery charge detection sensor, a pressure sensor, an optical sensor, a temperature sensor, a geomagnetic sensor, and a biometric sensor.

The sensor circuit 299 may include an acceleration sensor (accelerometer), a gyro sensor, and/or a geomagnetic sensor. The acceleration sensor may sense information on linear movement of the electronic pen 201. The gyro sensor may sense information related to rotation of the electronic pen 201. The geomagnetic sensor may sense information on the inclined state (e.g., orientation) of the electronic pen 201. The pen processor 220 may transmit information obtained from the sensor circuit 299 to the electronic device 101 through the communication circuit 290. Alternatively, the pen processor 220 may transmit information (e.g., coordinates of the electronic pen 201 and/or displacement of the electronic pen 201) related to the location of the electronic pen 201 to the electronic device 101 through the communication circuit 290, based on information obtained from the sensor circuit 299.

Figure 3:
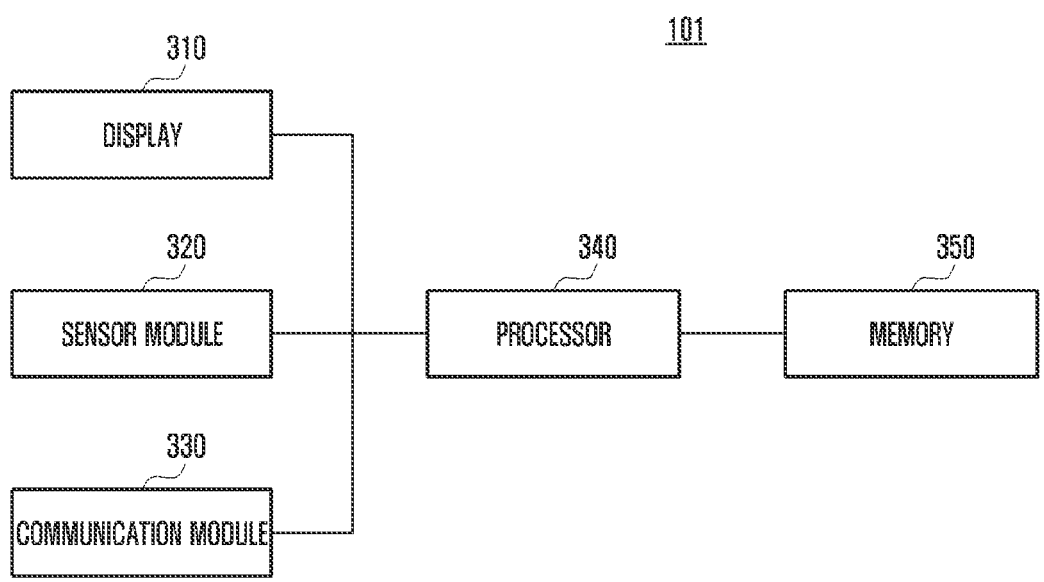
FIG. 3 is a block diagram of an example electronic device according to various embodiments of the disclosure.

FIG. 3 is a block diagram of an example electronic device according to various embodiments of the disclosure.

Referring to FIG. 3, the electronic device 101 according to an embodiment may include a display 310 (e.g., the display module 160 of FIG. 1), a sensor module 320 (e.g., the sensor module 176 of FIG. 1), a communication module 330 (e.g., the communication module 190 of FIG. 1), a processor 340 (e.g., the processor 120 of FIG. 1), and/or a memory 350 (e.g., the memory 130 of FIG. 1).

According to an embodiment, the electronic device 101 may accommodate or attach the electronic pen (e.g., the electronic pen 201 of FIG. 2) to an inner space or an outer space of the electronic device 101, but the manner of accommodation or attachment is not limited thereto. According to some embodiments, the electronic pen 201 may be configured as a separate external input device.

The display 310 may include an input/output device that performs an input function and a display function. The display 310 may include at least a part of the configuration of the display module 160 of FIG. 1 and/or the function of the input module 150 of FIG. 1. The display 310 may refer to a flat display or a flexible display. The display 310 may include at least one display. The display 310 may display a graphical user interface (GUI) element and/or visual information (e.g., text, graphics, images, videos, or combinations thereof).

According to an embodiment, the display 310 may be coupled to or adjacent to a touch sensing circuit, a pressure sensor capable of measuring the intensity (pressure) of a touch, and/or a digitizer circuit for detecting the electronic pen 201. The display 310 may be a touch-sensitive display. The touch-sensitive display may detect a touch using a user's finger (or other body part), a touch gesture, an air gesture, or a hover (or proximity touch) input. The touch-sensitive display may detect a touch of the electronic pen 201, an air command, or a hover input.

According to an embodiment, the display 310 may execute a function corresponding to an input signal of the electronic pen 201 and display a user interface (UI) corresponding thereto. For example, the display 310 may provide a pen theme UI related to the electronic pen 201.

The sensor module 320 may include a sensor capable of detecting at least one of states or situations associated with the display 310 such as, for example, a folding state of the electronic device 101, a folding state of the display 310, an activation area of the display 310, and a direction in which the user looks at the display 310. The sensor module 320 may include at least a part of the configuration and/or functions of the sensor module 176 of FIG. 1.

According to an embodiment, the sensor module 320 may detect whether the electronic pen 201 is detached. For example, the sensor module 320 may detect whether the electronic pen 201 is detached based on the changed value of a magnetic force, and transmit the detected mounting/detaching signal of the electronic device 101 to the processor 340.

According to an embodiment, the sensor module 320 may be the same as or similar to the sensor circuit 299 or the sensor module included in the electronic pen 201. For example, the sensor module 320 may be configured to control the electronic device 101 using the sensor circuit 299 of the electronic pen 201 when the electronic pen 201 capable of communication connection is used.

The communication module 330 may perform a near field communication connection with the electronic pen 201 (e.g., a stylus pen removed from the electronic device, a stylus pen separate from the electronic device). The communication module 330 may communicate with the electronic pen 201 using one of various types of near field communication methods, for example, Bluetooth Low Energy (BLE), but the communication method is not limited thereto. In a case in which the electronic pen 201 is located at a distance at which near field communication connection is possible, the communication module 330 may perform a communication connection with the electronic pen. The communication module 330 according to various embodiments may include at least a part of the configuration and/or functions of the communication module 190 of FIG. 1.

For example, the communication module 330 may receive electronic pen information (or sensor information) from the electronic pen 201. For example, the electronic pen information may include at least one of coordinate information or tilt information related to a hover input, or action coordinate information related to an air command.

The processor 340 is configured to control each component and/or perform operations related to communication or data processing of the electronic device 101, and may include at least a part of the configuration and/or function of the processor 120 of FIG. 1. Operations of the processor 340 to be described later may be performed by loading instructions stored in the memory 350.

The memory 350 is operatively connected to the processor 340 and may store data and various instructions that may be performed by the processor 340. Such instructions may include control commands such as arithmetic and logical operations, data movement, or input/output, which may be recognized by processor 340.

The memory 350 may store a program for executing a function corresponding to a control signal according to an input of the electronic pen 201 or a program (or application) supporting configuration of the electronic pen theme.

According to an embodiment, the processor 340 may execute a pen-themed application (hereinafter, referred to as an app) to display a user interface provided by the pen-themed app on the display 310. The pen-themed app may be an app capable of changing and/or configuring graphic objects (e.g., air command UI, or electronic pen pointer object) or pen sounds related to the electronic pen 201 according to user preference.

According to an embodiment, the processor 340 may control performance of operations or functions related to the pen-themed app. The processor 340 may display an electronic pen pointer corresponding to a hover input of the electronic pen 201. For example, the processor 340 may display a hover object (e.g., a dot pointer) configured as a default. In a case in which the user changes the electronic pen pointer theme through the pen-themed app, the processor 340 may display a modified hover object (e.g., a modified pointer) to which the pen theme is applied.

According to an embodiment, the processor 340 may adaptively (or real-time, automatic) determine the direction and coordinate of the electronic pen pointer displayed on the display 310 considering at least one of the visual characteristics of the electronic pen pointer, the state or situation of the electronic pen 201, and the state or situation of the display 310 to change the location of the electronic pen pointer.

Figure 4:
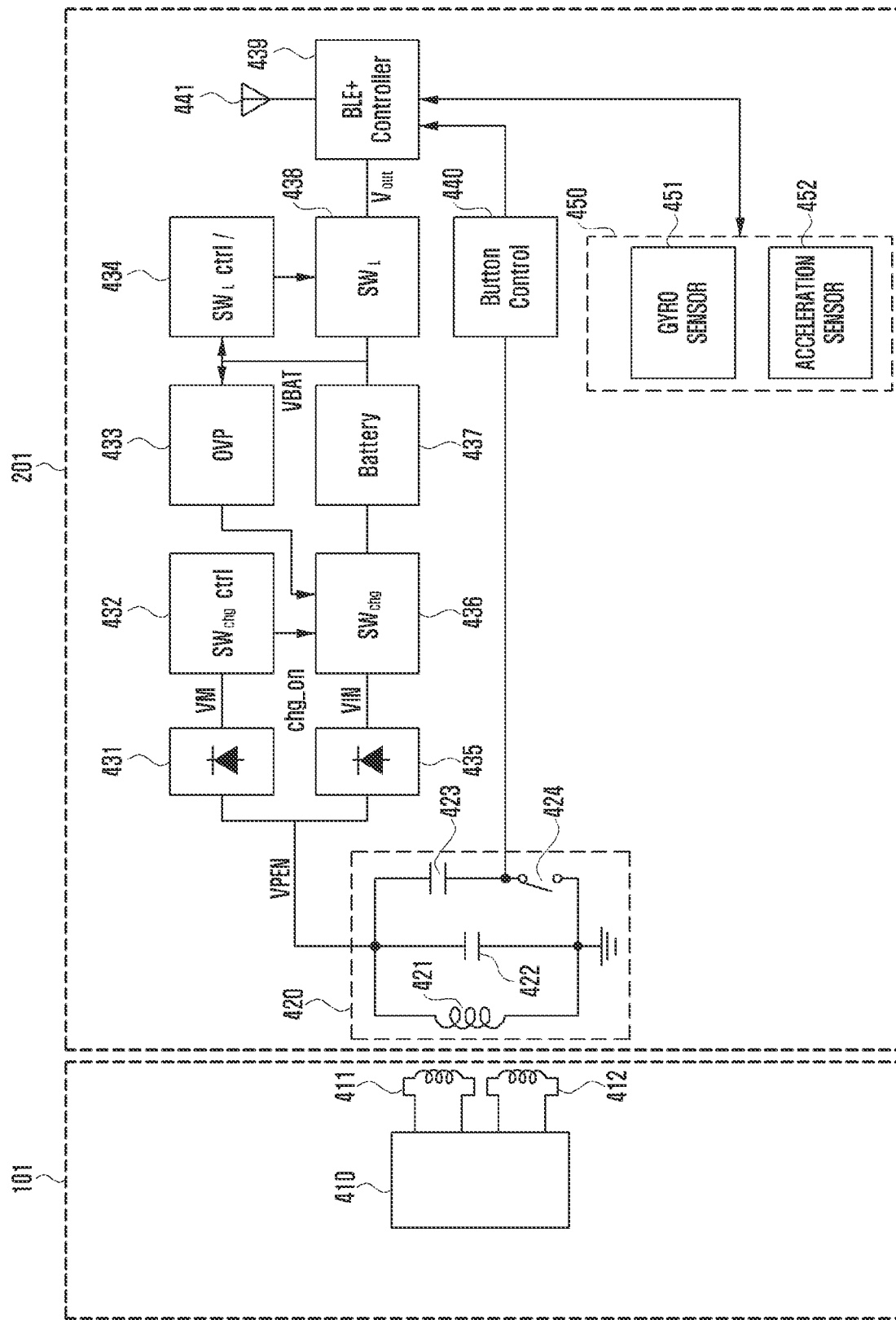
FIG. 4 is a diagram illustrating a configuration of an example electronic device and an example external electronic device according to various embodiments of the disclosure.

FIG. 4 is a diagram illustrating a configuration of an example electronic device and an electronic pen according to various embodiments of the disclosure.

Referring to FIG. 4, according to an embodiment, the electronic device (e.g., the electronic device 101 of FIG. 1, 3, or 4) may communicate with the electronic pen (e.g., the electronic pen 201 of FIGS. 2 and 4). The electronic device 101 and the electronic pen 201 may communicate using a communication circuit and at least one of various types of near field wireless communication methods. For example, the near field wireless communication method may be Bluetooth low energy (BLE) communication, but is not limited thereto.

The electronic device 101 may include a pen controller 410 (e.g., the processor 120 of FIG. 1 or the processor 340 of FIG. 3).

The pen controller 410 may include, for example, at least one amplifier (not shown) connected to at least one coil 411 and 412. The pen controller 410 may be connected to at least one coil 411 and 412, and may provide charging power to the electronic pen 201 through at least one coil 411 and 412.

According to an embodiment, in a case in which the electronic pen 201 is inserted into an inner space of the electronic device 101 (e.g., an inner space within a housing of the electronic device), the at least one coil 411 and 412 may be disposed at a position physically adjacent to the coil 421 of the electronic pen 201, but the arrangement position is not limited. On the other hand, the insertion into the inner space is by way of example, and the electronic device 101 may include an area (or space) to which the electronic pen 201 may be mounted (or attached), and in this case, the electronic pen 201 may be detached/attached from/to the corresponding area (or space) in addition to the internal space. At least some functions of the pen controller 410 may be implemented to be performed by the processor 120, or the pen controller 410 and the processor 120 may be integrated to be implemented to perform at least some functions.

For example, the pen controller 410 may include a control circuit (e.g., a control circuit independent of the processor 120), an inverter, and/or an amplifier.

The resonance circuit 420 (e.g., the resonance circuit 287 of FIG. 2) of the electronic pen 201 may include a coil 421, at least one capacitor 422 and 423, and/or a switch 424. In a case in which the switch 424 is in the off state, the coil 421 and the capacitor 422 may constitute a resonance circuit, and in a case in which the switch 424 is in the on state, the coil 421 and the capacitors 422 and 423 may constitute a resonance circuit. Accordingly, the resonance frequency of the resonance circuit 420 may be changed according to the on/off state of the switch 424. For example, the electronic device 101 may identify the on/off state of the switch 424 based on the frequency of the signal from the electronic pen 201. For example, in a case in which the button of the electronic pen 201 is pressed/released, the switch 424 may be turned on/off, and the electronic device 101 may identify whether the button of the electronic pen 201 is pressed based on the frequency of the received signal identified through the digitizer.

At least one rectifier 431 and 435 may rectify and output the AC waveform signal VPEN output from the resonance circuit 420. The charging switch controller (SWchg ctrl) 432 may receive the rectified signal VM output from the rectifier 431. Based on the rectified signal VM, the charging switch controller 432 may determine whether the signal generated by the resonance circuit 420 is a signal for charging (e.g., charging a battery 437) or a signal for detecting a position. For example, the charging switch controller 432 may determine whether the signal generated by the resonance circuit 420 is a signal for charging or a signal for detecting a position based on the magnitude of the voltage of the rectified signal VM. Alternatively, the charging switch controller 432 may determine whether a signal having a charging start pattern is input based on the waveform of the rectified signal VM.

The charging switch controller 432 may turn on or off the charging switch 436. The charging switch controller 432 may control charging of the battery 437.

In an embodiment, the charging switch 436 may transfer the charging power received from the rectifier 435 to the battery 437 under the control of the charging switch controller 432.

In a case in which the charging switch 436 is turned on, the battery 437 may be charged using the received rectified signal VIN. An over-voltage protection circuit (OVP) 433 may identify the battery voltage VBAT, and control the charging switch 436 to be in an off state if the battery voltage VBAT exceeds the over-voltage threshold.

In an embodiment, the load switch controller (SWL ctrl) 434 may measure a voltage value output from the battery 437.

When it is determined that the battery voltage VBAT exceeds the over-voltage threshold, the load switch controller (SWL ctrl) 434 may control the load switch (SWL) 438 to be in an on state. When the load switch 438 is turned on, power from the battery 437 may be transferred to the BLE communication circuit and controller (BLE+controller) 439 (e.g., the communication circuit 290 and the processor 220 of FIG. 2). The load switch controller 434 may include an under voltage lock out (UVLO) circuit.

In an embodiment, the load switch 438 may supply power required to operate the BLE+controller 439 under the control of the load switch controller 434. The load switch 438 may control a connection between the BLE+controller 439 and the battery 437.

The BLE+controller 439 may operate using the received power. In a case in which the distance between the electronic pen 201 and the electronic device 101 is greater than the threshold distance, the button control circuit 440 may transmit information on the input of the button to the BLE+controller 439. The BLE+controller 439 may transmit information on the received button input to the electronic device 101 through the antenna 441 (e.g., the antenna 297 of FIG. 2).

The sensor 450 (e.g., the sensor circuit 299 of FIG. 2) may include a gyro sensor 451 and/or an acceleration sensor 452. Sensing data obtained by the gyro sensor 451 and/or the acceleration sensor 452 may be transmitted to the BLE+controller 439.

The BLE+controller 439 may transmit a communication signal including the received sensing data to the electronic device 101 through the antenna 441. Alternatively, the BLE+controller 439 may identify information (e.g., coordinate and/or displacement of the electronic pen 201) related to the position of the electronic pen 201 identified based on the received sensing data. The BLE+controller 439 may transmit information related to the position of the identified electronic pen 201 to the electronic device 101 through the antenna 441.

In a case in which the electronic pen 201 is withdrawn or detached from the electronic device 101, the BLE+controller 439 may activate the acceleration sensor 452. The BLE+controller 439 may activate the gyro sensor 451 when a button is pressed. On the other hand, the activation time is merely an example, and there is no limit to the activation time for each sensor. In addition, the sensor 450 may further include a geomagnetic sensor. In a case in which only the acceleration sensor 452 is activated, the electronic pen 201 may provide acceleration information measured by the acceleration sensor 452 to the electronic device 101, and the electronic device 101 may operate based on the position and acceleration information of the electronic pen 201 identified based on the electronic pen signal.

Figure 5:
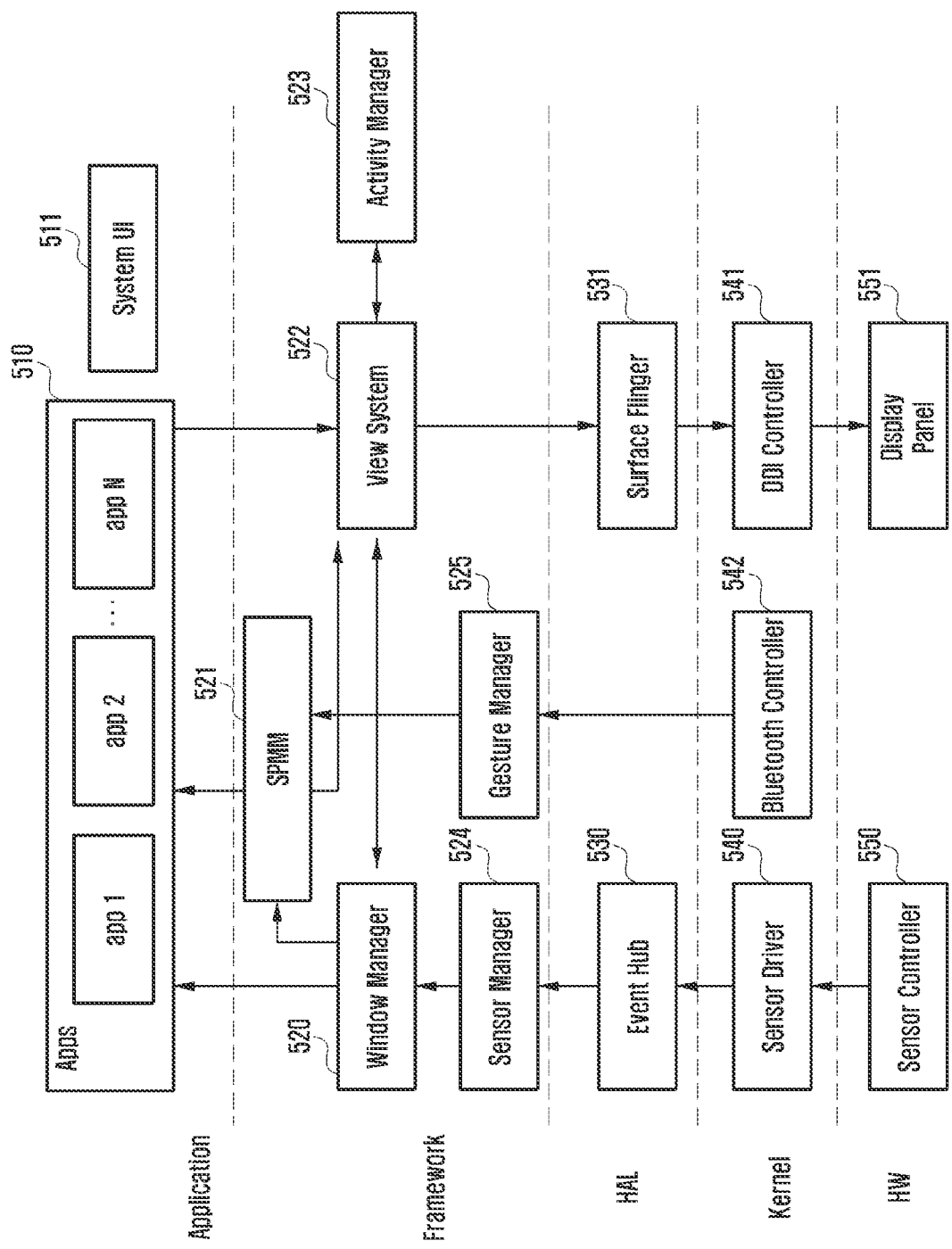
FIG. 5 illustrates a structure of an example electronic pen platform of an electronic device according to various embodiments.

FIG. 5 illustrates a structure of an example electronic pen platform of an electronic device according to various embodiments.

Referring to FIG. 5, the electronic device (e.g., the electronic device 101 of FIG. 1, 3, or 4) according to various embodiments may manage the operation of the electronic pen (e.g., the electronic pen 201 of FIGS. 2 and 4) based on the electronic pen framework. The configuration of the electronic device 101 illustrated in FIG. 5 may be implemented in software being executed by a processor (e.g., the processor 120 of FIG. 1 or the processor 340 of FIG. 3) and loaded into a memory (e.g., the memory 130 of FIG. 1 or the memory 350 of FIG. 3). For example, the configuration of the software-implemented electronic device 101 may be divided into an application layer, a framework layer, a hardware abstraction layer (HAL), a kernel driver layer, and/or a hardware (HW) layer.

The application layer may include applications 510 and a system user interface 511 (system UI). The applications 510 may be stored in the memory of the electronic device 101, executable by the processor, or include installed applications, for example, app1 app2, . . . , appN, and one of the installed applications may be an electronic pen app, and may be an application that provides interaction with a user for configuring the electronic pen. The system user interface 511 may be an application that controls the display of a system of the electronic device 101, for example, a fixed region/part of a screen or a common function. For example, the system user interface 511 may manage a notification bar or a screen related to a quick view.

The framework layer may include a window manager 520, a pen pointer movement manager 521 (SPMM: stylus (e.g., electronic pen) pointer movement manager), a view system 522, an activity manager 523, a sensor manager 524, and/or a pen (stylus) gesture manager 525. The window manager 520 may manage one or more GUI resources used on the screen. For example, the window manager 520 may transmit information on the display area of the electronic device 101 to the applications 510.

In an embodiment, the window manager 520 may transmit information on the display area corresponding to a changed state of the electronic device 101 to the application 510. The window manager 520 may identify a state change of the electronic device 101 through a sensor module (e.g., the sensor module 176 of FIG. 1). For example, in a case in which a state change of the electronic device 101 is identified, the window manager 520 may transmit information on the display area corresponding to the changed state of the electronic device 101 to the application 510 for which continuity is configured among the running applications 510.

In an embodiment, the pen pointer movement manager 521 is illustrated as being included in the framework layer, but may not be limited thereto. For example, the pen pointer movement manager 521 may be disposed between the application layer and the framework layer.

The pen pointer movement manager 521 may manage resources used for the theme of the electronic pen 201 under the control of the processor 120. The pen pointer movement manager 521 may perform overall management of the theme of the electronic pen 201, such as changing the configuration or updating of the user interface related to the electronic pen 201. For example, the pen pointer movement manager 521 may control display and position change of the pen pointer of the electronic pen 201.

The pen pointer movement manager 521 may receive display information from the display (e.g., the display module 160 of FIG. 1 or the display 310 of FIG. 3) and receive electronic pen information from the electronic pen 201 under the control of the processor 120. The display information may include information on a refresh rate of the display (e.g., the display module 160 of FIG. 1 or the display 310 of FIG. 3). For example, the refresh rate of the display (e.g., the display module 160 of FIG. 1 or the display 310 of FIG. 3) may be 60 Hz or 120 Hz, but is not limited thereto.

The electronic pen information may be information on a coordinate transmission rate of the electronic pen 201. For example, the electronic pen information may include a transmission rate of 20 times per second or a transmission rate of 30 times per second, but is not limited thereto. The pen pointer movement manager 521 may determine an operation of the pen pointer based on display information and electronic pen information under the control of the processor 120. The pen pointer movement manager 521 may control the display (e.g., the display module 160 of FIG. 1 or the display 310 of FIG. 3) based on the determined pen pointer operation. For example, the pen pointer movement manager 521 may control a pen pointer display time point of the display (e.g., the display module 160 of FIG. 1 or the display 310 of FIG. 3) based on the determined pen pointer operation. The pen pointer movement manager 521 may control to calculate intermediate coordinates and/or delayed coordinates of the pen pointer on the display (e.g., the display module 160 of FIG. 1 or the display 310 of FIG. 3), and to display the calculated intermediate coordinates and/or delayed coordinates on the display (e.g., the display module 160 of FIG. 1 or the display 310 of FIG. 3) based on the determined pen pointer operation.

In an embodiment, the pen pointer movement manager 521 may manage a coordinate system including coordinate information of the pen pointer according to the movement of the pen pointer on the display.

In an embodiment, the view system 522 may be a program for drawing a layer based on the resolution of the display 160.

The application 510 may draw a layer based on the resolution of the display 160 using the view system 522.

The view system 522 may include a set of extensible views used to generate a user interface of the application 510. The activity manager 523 may control the life cycle and activity stack of the application 510. The sensor manager 524 may control sensor information included in the sensor module 176. The pen gesture manager 525 may identify a gesture corresponding to the movement information based on the movement information of the electronic pen 201 obtained through the Bluetooth controller 542 and transmit the information on the gesture to the pen pointer movement manager 521.

The hardware abstraction layer (HAL) is an abstraction layer between a plurality of hardware modules included in the hardware layer and software of the electronic device 101, and may include an event hub 530 and a surface flinger 531. The event hub 530 may be an interface standardizing events occurring in the touch circuit and the sensor circuit. The surface flinger 531 may synthesize a plurality of layers, and may provide data representing a plurality of synthesized objects to the display controller. Here, the display controller may refer to, for example, a graphic display controller.

The kernel layer may include various drivers for controlling various hardware modules included in the electronic device 101. For example, the kernel layer may include a sensor driver 540 controlling a sensor controller connected to a sensor, a display controller (e.g., display driver IC, DDI) 541 controlling a display panel, and a Bluetooth controller 542 controlling Bluetooth, but is not limited thereto. The hardware (HW) layer may include a hardware module or components included in the electronic device 101, for example, a sensor controller 550 and a display panel 551, and may include at least some of the components illustrated in FIG. 1.

In an embodiment, the hardware (HW) layer may identify a state change of the electronic device 101 based on the sensor module 176. The sensor controller 550 may control the sensor module 176. The display panel 551 may sense a user's touch input using a touch sensor.

Figure 6:
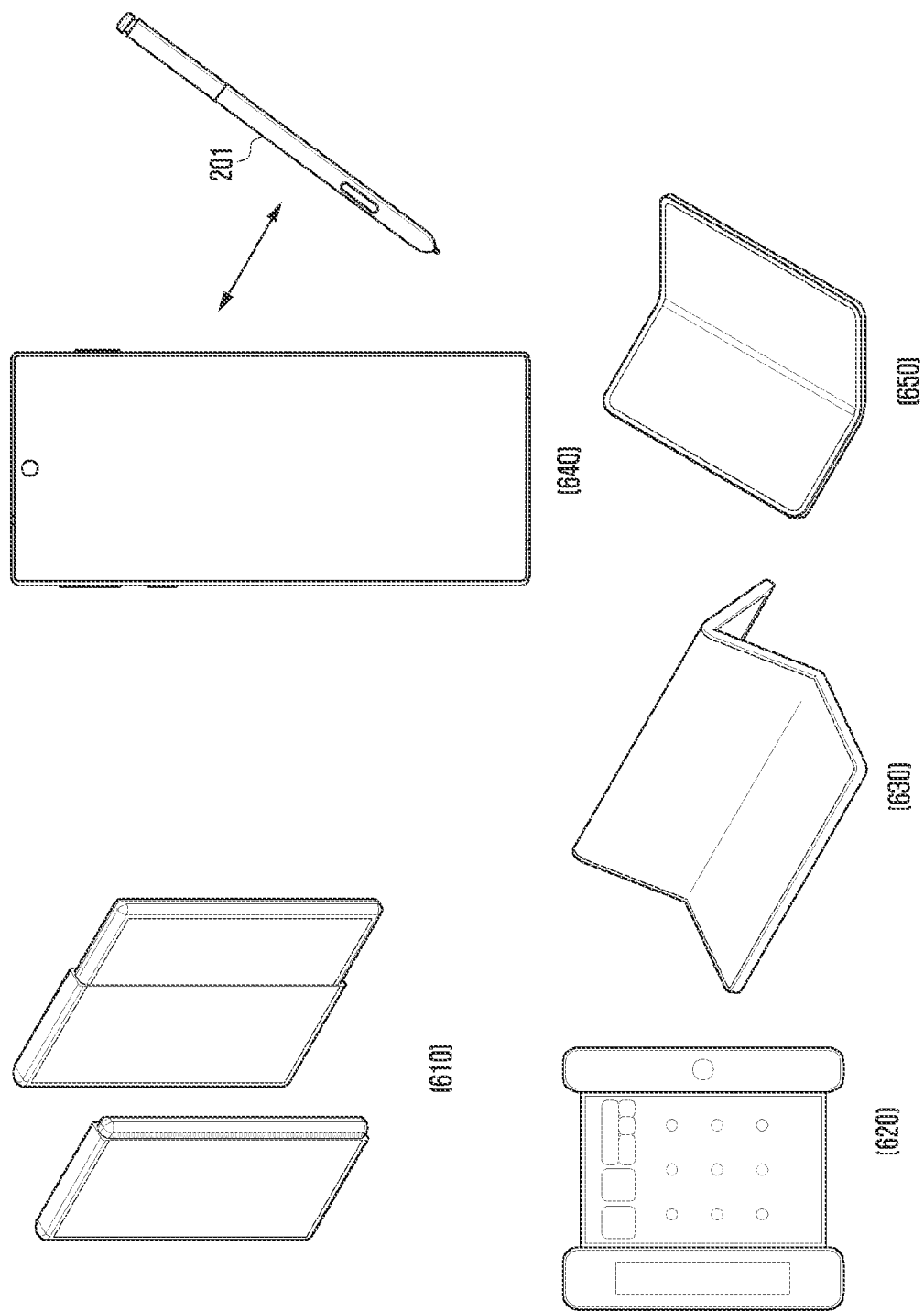
FIG. 6 is a diagram illustrating a form factor of an example electronic device according to various embodiments.

FIG. 6 is a diagram illustrating example form factors of an electronic device according to various embodiments.

Referring to FIG. 6, an electronic device (e.g., the electronic device 101 of FIG. 1) according to various embodiments may be implemented in various types of form factors. For example, the electronic device 101 may include at least one of a slidable electronic device 610, a rollable electronic device 620, a first foldable electronic device 630, a stylus electronic device 640 linked with an electronic pen (e.g., the electronic pen 201 of FIG. 2), a second foldable electronic device 650, and the like. The first foldable electronic device 630 may include at least two hinge structures, and the second foldable electronic device 650 may include one hinge structure. The first foldable electronic device 630 or the second foldable electronic device 650 is equipped with a folding (or bending) display, and may be used by folding or unfolding based on the hinge structure.

An electronic device (e.g., the electronic device 101 of FIG. 1) according to various embodiments of the disclosure may include a communication module (e.g., the communication module 190 of FIG. 1), a display (e.g., the display module 160 of FIG. 1), a memory (e.g., the memory 130 of FIG. 1), and a processor (e.g., the processor 120 of FIG. 1) operatively connected to the communication module, the display, or the memory, and the processor may connect with the electronic pen 201 through the communication module using near field wireless communication, identify input information (e.g., specific gesture) mapped corresponding to motion data (e.g., moving distance information or angle information) obtained through the near field wireless communication from the electronic pen, and control the display to perform an operation corresponding to input information.

Figure 7A:
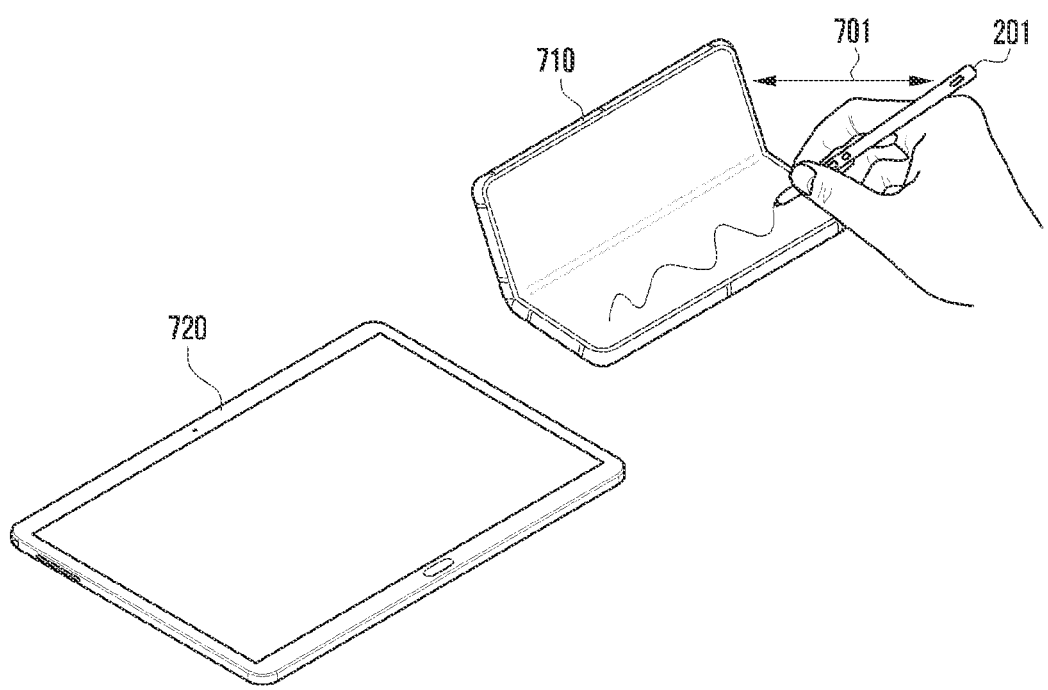
FIGS. 7A and 7B are diagrams illustrating an example of a data input method of an electronic pen to a plurality of electronic devices according to various embodiments.
Figure 7B:
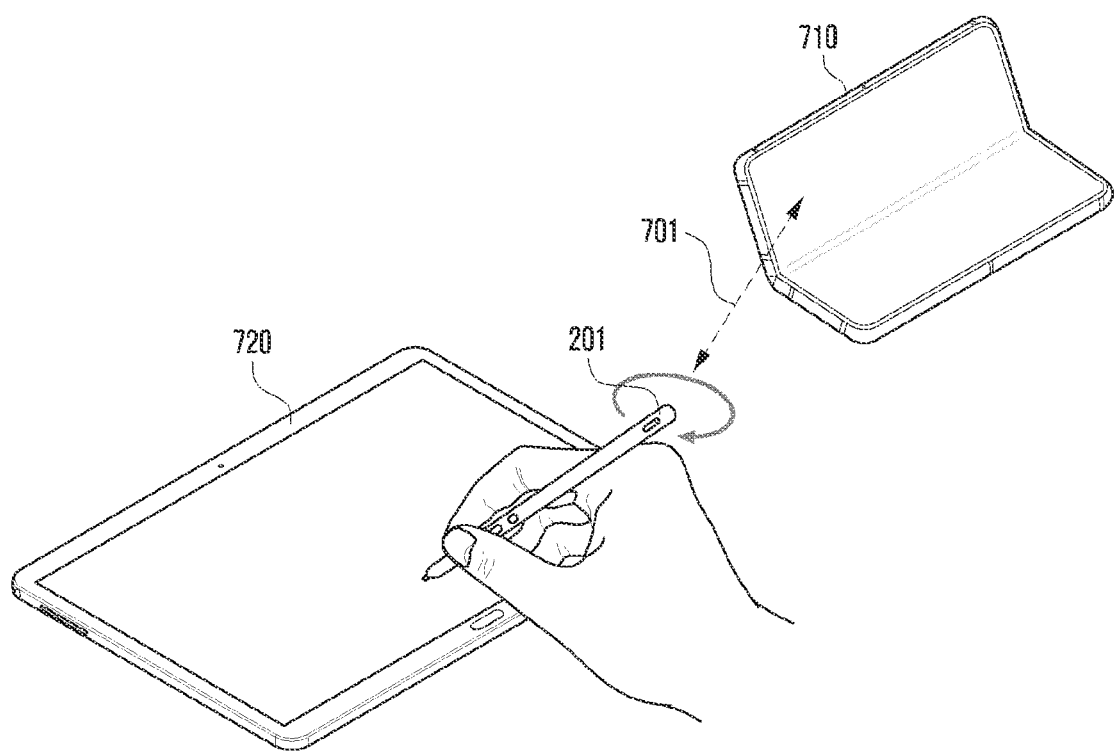

FIGS. 7A and 7B are diagrams illustrating an example of a data input method of an electronic pen (e.g., the electronic pen 201 of FIG. 2) to a plurality of electronic devices (e.g., the electronic device 610, 620, 630, 640, and/or 650 of FIG. 6) according to various embodiments.

Referring to FIGS. 7A and 7B, the electronic pen 201 may provide an input function through a hover input to two or more electronic devices (e.g., the first electronic device 710 and the second electronic device 720) (e.g., the electronic device 101 of FIG. 1, 3, or 4).

According to an embodiment, the first electronic device 710 may include components of the electronic device 101 illustrated in FIG. 1. For example, the first electronic device 710 may include a display (e.g., the display 310 of FIG. 3) including an input/output device that performs an input function and a display function. The display may include at least a part of the configuration of the display module 160 of FIG. 1 and/or the function of the input module 150 of FIG. 1. The display may refer to a flat display or a flexible display.

According to an embodiment, the display of the first electronic device 710 may be coupled to or disposed adjacent to an electromagnetic sensor including a digitizer circuit for detecting the electronic pen 201, and may detect an air gesture or hover (or proximity touch) input using the electronic pen 201. Hereinafter, an input function using an electromagnetic sensor, such as a gesture, an air gesture, or a hover (or proximity touch) input using the electronic pen 201, may be referred to as a hover input function.

According to an embodiment, the second electronic device 720 may include components of the electronic device 101 illustrated in FIG. 1. For example, the second electronic device 720 may include a display (e.g., the display 310 of FIG. 3) including an input/output device that performs an input function and a display function. The display may include at least a part of the configuration of the display module 160 of FIG. 1 and/or the function of the input module 150 of FIG. 1. The display may refer to a flat display or a flexible display.

According to an embodiment, the display of the second electronic device 720 may be coupled to or disposed adjacent to an electromagnetic sensor including a digitizer circuit detecting the electronic pen 201, and may perform a hover-input function by detecting an air gesture or hover (or proximity touch) input using the electronic pen 201.

According to an embodiment, in a case in which the electronic pen 201 approaches the display of the first electronic device 710 or the second electronic device 720 to perform the hover input function, the electronic pen may detect that the hover input function is performed by an electromagnetic sensor including a resonance circuit (e.g., the resonance circuit 287 of FIG. 2). For example, in a case in which the electronic pen 201 approaches the display of the first electronic device 710 or the second electronic device 720 and approaches within a point at which the hover input function may be performed, the resonance circuit 287 of the electronic pen 201 may output a sensor signal greater than or equal to a specified threshold value. According to an embodiment, the processor (e.g., the processor 220 of FIG. 2) of the electronic pen 201 may generate an approach indicator in a case in which the resonance circuit 287 outputs a sensor signal greater than or equal to a specified threshold value.

According to an embodiment, the first electronic device 710 may include a communication module (e.g., the communication module 190 of FIG. 1 or the communication module 330 of FIG. 3) and may communicate with the electronic pen 201 using one of the near field wireless communication, for example, Bluetooth or Bluetooth low energy (BLE), but is not limited thereto, and the near field wireless communication may be performed according to various protocols.

According to an embodiment, in a case in which the electronic pen 201 is located at a distance capable of the near field communication connection 701 through the communication module 190 or 330, the first electronic device 710 may perform mutual communication connection.

According to an embodiment, the motion sensor (e.g., the sensor circuit 299 of FIG. 2 or the sensor 450 of FIG. 4) of the electronic pen 201 may include a gyro sensor, a geomagnetic sensor, and/or an acceleration sensor. The electronic pen 201 may obtain a motion sensor value through the motion sensor 299 or 450.

According to an embodiment, in FIG. 7A, the electronic pen 201 may transmit the motion sensor value obtained through the motion sensor 299 or 450 to the first electronic device 710 through near field wireless communication technology (e.g., Bluetooth or Bluetooth low energy) to perform various input functions for controlling the first electronic device 710. Hereinafter, as an input function of the electronic pen 201, a motion sensor value obtained through a motion sensor and transmitted to the first electronic device 710 through the near field wireless communication to perform an input function is referred to as a motion input function. According to the motion input function, one of various operations for controlling the function of the first electronic device 710 may be mapped in response to motion information (e.g., gesture) extracted from the obtained motion sensor value. For example, the function of the first electronic device 710 may include an operation of controlling a function displayed on the display. For example, an operation of popping up arbitrary content or an item selected while an app including a number of selectable content or items, such as a gallery, email, message, contact, or My Files is running and displayed on the screen, may be mapped in response to specific motion information.

Referring to FIG. 7A as an example, the electronic pen 201 may be connected to the first electronic device 710 through near field wireless communication to transmit/receive data to/from the first electronic device 710, and simultaneously perform a hover input function, such as a drawing input, a button input, or an erasing input, through a gesture, an air gesture, or a hover (or proximity touch) input on the display of the first electronic device 710.

Referring to FIG. 7B as an example, the electronic pen 201 may be connected to the first electronic device 710 through the near field wireless communication connection 701 to transmit/receive data to/from the first electronic device 710, and perform a hover input function to the second electronic device 720 through a gesture, an air gesture, or a hover (or proximity touch) input on the display of the second electronic device 720.

According to an embodiment, in a case in which the electronic pen 201 approaches the display of the first electronic device 710 or the second electronic device 720, the processor 220 of the electronic pen 201 may generate an approach indicator when the output value of the electromagnetic sensor is greater than or equal to a specified threshold value according to the proximity of the electronic pen 201. In addition, the processor 220 of the electronic pen 201 may obtain a motion sensor value through a motion sensor according to the movement of the electronic pen 201.

According to an embodiment, the processor of the electronic pen 201 may transmit the approach indicator generated according to movement in proximity to the display of the first electronic device 710 or the second electronic device 720 together with the motion sensor value obtained through the motion sensor to the first electronic device 710 through the near field wireless communication.

According to an embodiment, in a case where the electronic pen 201 moves in a state not close to the display of the first electronic device 710 or the second electronic device 720, the processor 220 of the electronic pen 201 may not generate an approach indicator because the output value of the electromagnetic sensor according to the proximity of the electronic pen 201 is less than a specified threshold, but may obtain a motion sensor value through a motion sensor according to movement.

According to an embodiment, the processor of the electronic pen 201 may transmit a motion sensor value obtained according to movement in a state not close to the display of the first electronic device 710 or the second electronic device 720 to the first electronic device 710 through the near field wireless communication. In this case, the motion sensor value may not be transmitted along with the approach indicator.

According to an embodiment, the first electronic device 710 may receive a motion sensor value from the electronic pen 201 through the near field wireless communication, and may ignore the received motion sensor value and not perform a motion input function for the first electronic device 710 if the received motion sensor value is received together with the approach indicator. In a case in which the received motion sensor value is received together with the approach indicator, it may correspond to a case in which a hover input function (rather than a motion input function) is performed close to the display of the first electronic device 710 or the display of the second electronic device 720.

According to an embodiment, the first electronic device 710 may accumulate the motion sensor value received from the electronic pen 201 through the near field wireless communication for a specified time, and may analyze the accumulated motion sensor value to obtain motion information. In this case, when the approach indicators are received together with the received motion sensor values, the number of received approach indicators may be counted, and when the number of approach indicators is greater than or equal to a specified threshold value, the received motion sensor values may be ignored or discarded, and a motion input function may not be performed. Here, the time for accumulating the motion sensor value is not limited to any particular time, and, for example, the time may be statistically calculated and pre-specified, or may be accumulated up to a time for which meaningful motion information may be obtained within a buffer capacity range.

According to an embodiment, the first electronic device 710 may receive a motion sensor value from the electronic pen 201 through the near field wireless communication, and may perform a motion input function when the received motion sensor value is not received together with an approach indicator.

According to an embodiment, the first electronic device 710 may accumulate motion sensor values received from the electronic pen 201 through near field wireless communication, may count the number of approach indicators received together with the received motion sensor values, may obtain motion information from accumulated motion sensor values if the number of approach indicators is less than a specified threshold value, and may perform a motion input function corresponding to the obtained motion information. For example, the first electronic device 710 may perform a matched motion input function corresponding to the motion information (e.g., specified gesture) extracted from the accumulated motion sensor value, so that, for example, a control operation on the first electronic device 710, such as a pop-up of a specific menu, is performed.

Figure 8A:
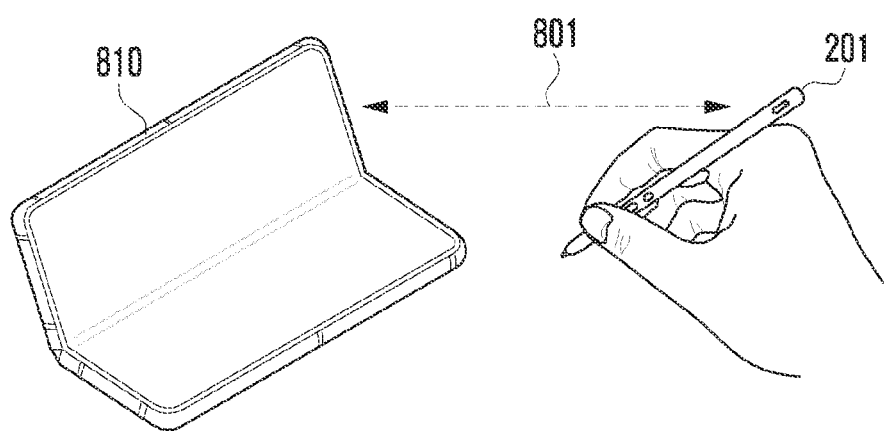
FIGS. 8A and 8B are diagrams illustrating an example of a data input method of an electronic pen according to various embodiments.
Figure 8B:
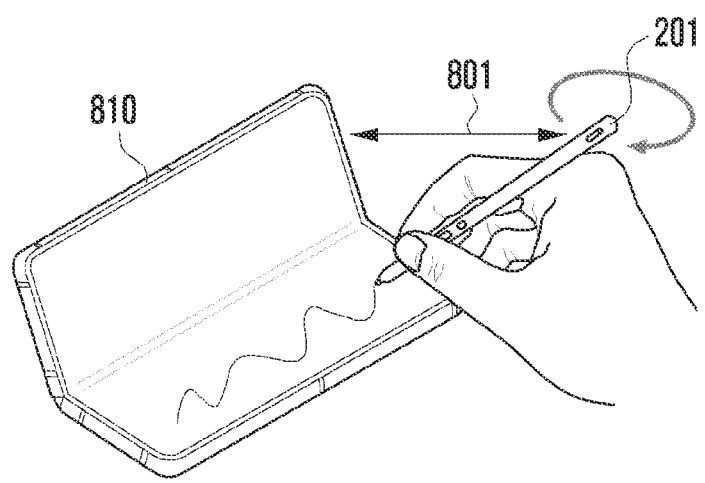

FIGS. 8A and 8B are diagrams illustrating an example of a data input method for an electronic device (e.g., the electronic device 101 of FIG. 1, 3, or 4) of an electronic pen (e.g., the electronic pen 201 of FIG. 2 or FIG. 4) according to various embodiments.

Referring to FIGS. 8A and 8B, the electronic pen 201 may provide a hover input function and/or a motion input function to an electronic device 810.

According to an embodiment, the electronic device 810 may include components of the electronic device 101 illustrated in FIG. 1. For example, the electronic device 810 may include a display (e.g., the display 310 of FIG. 3) including an input/output device that performs an input function and a display function. The display may include at least a part of the configuration of the display module 160 of FIG. 1 and/or the function of the input module 150 of FIG. 1. The display may refer to a flat display or a flexible display.

According to an embodiment, the display of the electronic device 810 may be coupled to or disposed adjacent to an electromagnetic sensor including a digitizer circuit detecting the electronic pen 201, and may detect an air gesture or hover (or proximity touch) input using the electronic pen 201.

According to an embodiment, the electronic device 810 may include a communication module (e.g., the communication module 190 of FIG. 1 or the communication module 330 of FIG. 3) and may communicate with the electronic pen 201 using one of the near field wireless communication, for example, Bluetooth or Bluetooth low energy (BLE), but is not limited thereto, and the near field wireless communication may be performed according to various protocols.

According to an embodiment, in a case in which the electronic pen 201 is located at a distance capable of near field communication connection through the communication module 190 or 330, the electronic device 810 may perform mutual communication connection.

According to an embodiment, the motion sensor (e.g., the sensor circuit 299 of FIG. 2 or the sensor 450 of FIG. 4) of the electronic pen 201 may include a gyro sensor, a geomagnetic sensor, and/or an acceleration sensor. The electronic pen 201 may obtain a motion sensor value through the motion sensor 299 or 450.

In FIG. 8A, the processor (e.g., the processor 220 of FIG. 2) of the electronic pen 201 may transmit the motion sensor value obtained through the motion sensor 299 or 450 to the electronic device 810 through the wireless link 801 connected through a near field wireless communication technology (e.g., Bluetooth or Bluetooth low energy) to perform the motion input function for controlling the electronic device 810.

Referring to FIG. 8B, in a case in which the electronic pen 201 approaches the display of the electronic device 810 to perform the hover input function, the electronic pen may identify that the hover input function is performed by an electromagnetic sensor including a resonance circuit (e.g., the resonance circuit 287 of FIG. 2) by the output of the sensor signal. For example, in a case in which the electronic pen 201 approaches the display of the electronic device 810 and approaches within a point at which the hover input function may be performed, the resonance circuit 287 of the electronic pen 201 may output a sensor signal greater than or equal to a specified threshold value. According to an embodiment, the processor 220 of the electronic pen 201 may generate an approach indicator in a case in which the resonance circuit 287 outputs a sensor signal greater than or equal to a specified threshold value.

According to an embodiment, the electronic device 810 may receive a motion sensor value from the electronic pen 201 through the near field wireless communication, and may perform a motion input function when the received motion sensor value is not received together with an approach indicator. For example, the electronic device 810 may be controlled to perform a matched motion input function in response to motion information (e.g., specified gesture) extracted from a motion sensor value, and for example, a control operation for the electronic device 810, such as a pop-up of a specific menu, may be performed.

According to an embodiment, the electronic device 810 may receive a motion sensor value from the electronic pen 201 through the near field wireless communication, and may ignore the received motion sensor value and not perform a motion input function for the electronic device 810 if the received motion sensor value is received together with the approach indicator. In a case in which the received motion sensor value is received together with the approach indicator, it may correspond to the case that a hover input function is performed close to the display of the electronic device 810.

According to an embodiment, the electronic device 810 may accumulate the motion sensor values received from the electronic pen 201 through the near field wireless communication for a specified time, and may analyze the accumulated motion sensor values to obtain motion information. In this case, when the approach indicators are received among the received motion sensor values, the number of received approach indicators may be counted, and when the number of approach indicators is greater than or equal to a specified threshold value, the received motion sensor values may be ignored or discarded, and a motion input function may not be performed.

According to various embodiments, an electronic device (e.g., the electronic device 101 of FIG. 1, 3, or 4) may include a display (e.g., the display module 160 of FIG. 1), a wireless communication circuit (e.g., the wireless communication module 192 of FIG. 1), and at least one processor (e.g., the processor 120 of FIG. 1) operatively connected to the display and the wireless communication circuit, and the at least one processor may be configured to receive motion sensor values from an external electronic device through the wireless communication circuit, count the number of approach indicators received together with the motion sensor values, and discard the received motion sensor values when the number of received approach indicators exceeds a threshold value.

According to various embodiments, the processor may extract motion information from the motion sensor values and control the electronic device to perform an operation of executing a function of the electronic device in response to the motion information based on the number of received motion sensor values being equal to or less than the threshold value.

According to various embodiments, the electronic device may be configured to perform a mapped operation in response to the motion information among functions of the display according to the input operation.

According to various embodiments, the approach indicator may indicate that the motion sensor value transmitted along with the approach indicator is generated at a time point when the external electronic device approaches (e.g., within some predetermined distance) a display of the electronic device or another electronic device.

According to various embodiments, the processor may be configured to connect to the external electronic device using a communication protocol designated through the wireless communication circuit, and receive the motion sensor values based on the communication protocol.

According to various embodiments, the processor may be configured to receive the motion sensor values through the wireless communication circuit in response to receiving a signal triggering the receiving of the motion sensor values.

According to various embodiments, an electromagnetic sensor may be additionally included, and the processor may control the external electronic device to perform an input operation of the display based on a sensor signal received from the electromagnetic sensor as the external electronic device approaches the display.

Figure 9:
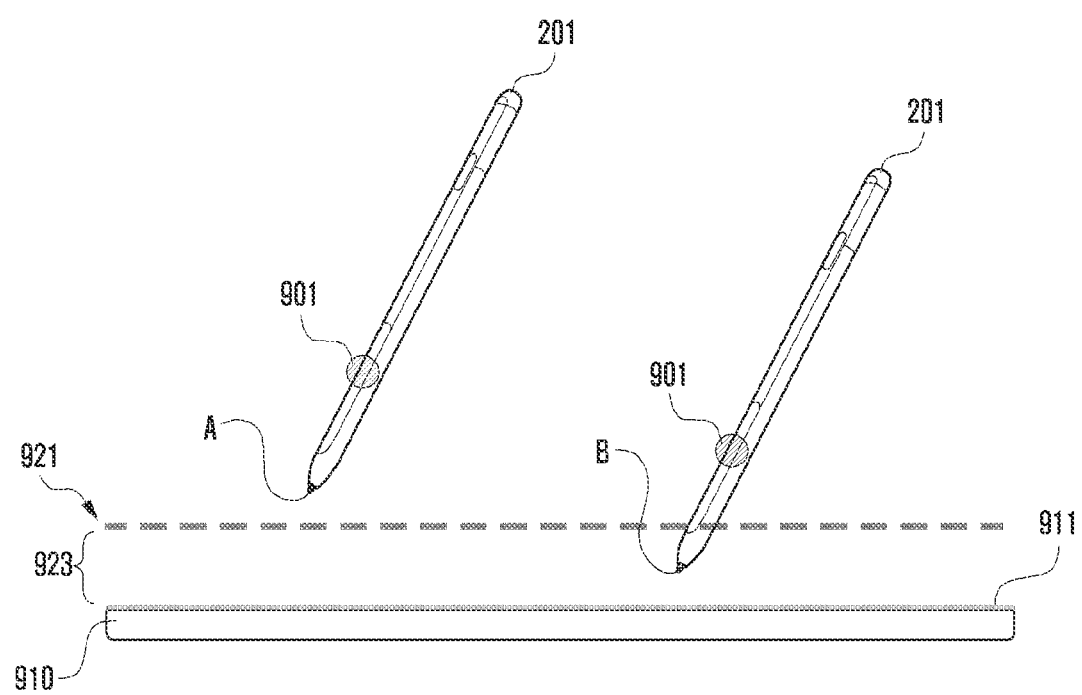
FIG. 9 is a diagram illustrating an example of an operation of controlling a hover input or a motion input of an electronic pen according to various embodiments.
Figure 10:
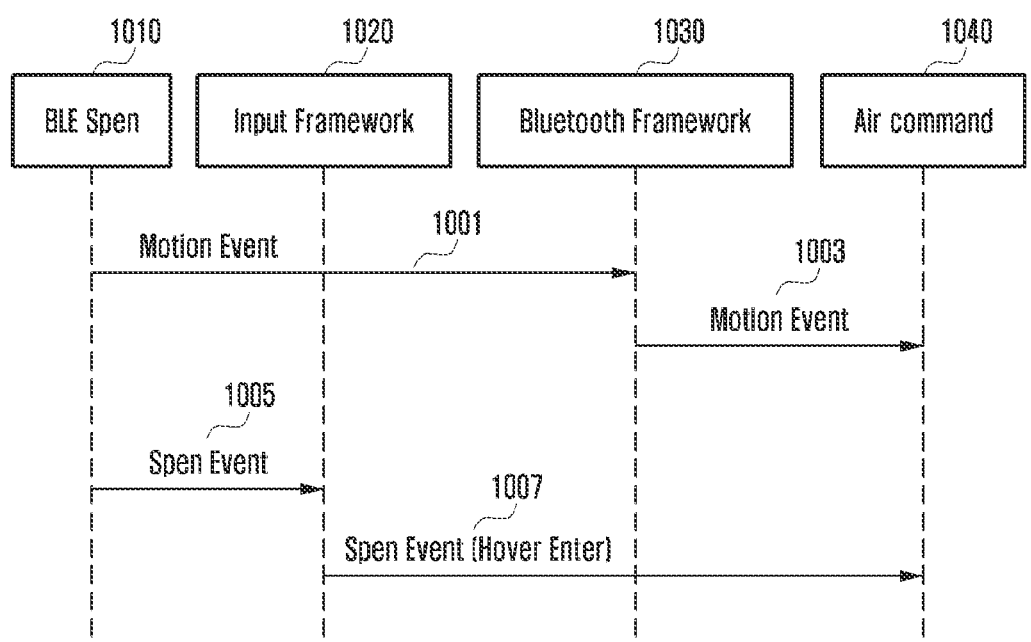
FIG. 10 is a signal flowchart illustrating an example of a hover input or motion input operation of an electronic pen according to various embodiments.

FIG. 9 is a diagram illustrating an example of an operation of controlling a hover input or a motion input of an electronic pen (e.g., the electronic pen 201 of FIG. 2 or FIG. 4) according to various embodiments. FIG. 10 is a signal flowchart illustrating an example of a framework in which an electronic device 910 (e.g., the electronic device 101 of FIG. 1, 3, or 4) processes a hover input or motion input operation of the electronic pen 201 according to various embodiments.

Referring to FIG. 9, the electronic pen 201 may be connected to the electronic device 910 through a near field wireless communication network.

According to an embodiment, the electronic device 910 may include components of the electronic device 101 illustrated in FIG. 1. For example, the electronic device 810 may include a display 911 (e.g., the display 310 of FIG. 3) including an input/output device that performs an input function and a display function. The display 911 may include at least a part of the configuration of the display module 160 of FIG. 1 and/or the function of the input module 150 of FIG. 1. The display may refer to a flat-panel display or a flexible display.

According to an embodiment, the display 911 of the electronic device 910 may be coupled to or disposed adjacent to an electromagnetic sensor including a digitizer circuit detecting the electronic pen 201, and may detect an air gesture or hover (or proximity touch) input using the electronic pen 201.

According to an embodiment, the electronic device 910 may include a communication module (e.g., the communication module 190 of FIG. 1 or the communication module 330 of FIG. 3) and may communicate with the electronic pen 201 using one of the near field wireless communication, for example, Bluetooth or Bluetooth low energy technology (BLE), but is not limited thereto, and the near field wireless communication may be performed according to various protocols.

According to an embodiment, as the button 901 of the electronic pen 201 is pressed down, the electronic pen 201 may notify the electronic device 910 that the motion input function is started. The start of the motion input function may be triggered through the button 901, but the disclosure is not limited thereto, and, for example, the start of the motion input function may be implemented to be triggered when the electronic pen 201 starts outputting the motion sensor value at a specified speed or more.

According to an embodiment, as the button 901 of the electronic pen 201 is released, the electronic pen 201 may notify the electronic device 910 that the motion input function is terminated. The end of the motion input function may be notified through the operation of the button 901, but the disclosure is not limited thereto, and, for example, may be implemented such that, when the electronic pen 201 is maintained at a specified speed or less for a specified time or more, the end of the motion input function is triggered according to a motion sensor value not being output. Here, the button 901 is described as a button that is pressed (and held) and then released. However, the type of the button 901 is not limited to this example, and the button 901 may be a button that is slidable between two positions, or a button that is pressed once to start the function and pressed again to end the function.

According to an embodiment, the motion sensor (e.g., the sensor circuit 299 of FIG. 2 or the sensor 450 of FIG. 4) of the electronic pen 201 may include a gyro sensor, a geomagnetic sensor, and/or an acceleration sensor. The electronic pen 201 may obtain a motion sensor value through the motion sensor 299 or 450.

According to an embodiment, in a case in which the processor (e.g., the processor 220 of FIG. 2) of the electronic pen 201 approaches the display 911 of the electronic device 910 within a specified range 921 to perform the hover input function, a sensor signal is output by an electromagnetic sensor including a resonance circuit (e.g., the resonance circuit 287 of FIG. 2). For example, when the electronic pen 201 approaches within a specified distance 923 to the display 911 of the electronic device 910 within a point 921 at which a hover input function may be performed, the resonance circuit 287 of the electronic pen 201 may output a sensor signal greater than or equal to a specified threshold value. According to an embodiment, in a case in which the resonance circuit 287 outputs a sensor signal greater than or equal to a specified threshold value, the processor 220 of the electronic pen 201 may generate an approach indicator.

According to an embodiment, the electronic device 910 may receive a motion sensor value transmitted from the electronic pen 201 through the near field wireless communication at point A, and, in this case, because the received motion sensor value may not be received together with the approach indicator, the electronic device may perform a motion input function.

In this case, referring to FIG. 10, the BLE S-pen 1010 (e.g., electronic pen 201) may transmit (1001) a signal indicating that a motion event (e.g., motion input) has occurred to the Bluetooth framework 1030 of the electronic device 910 through the near field wireless communication, for example, a BLE link, and the Bluetooth framework 1030 may transmit (1003) a signal indicating that a motion event occurs to an air command 1040 that performs a motion input function and a hover input function to perform a motion input function matching the received motion event.

Referring again to FIG. 9, the electronic device 910 may receive a motion sensor value transmitted by the electronic pen 201 through the near field wireless communication at point B. Because the received motion sensor value may be received together with the approach indicator, the electronic device may ignore the received motion sensor value and may not perform a motion input function. In this case, the electronic device 910 may recognize a hover input function performed by the electronic pen 201 close to the display 911.

In this case, referring again to FIG. 10, a signal indicating that an S-pen event (e.g., hover input) of the BLE S-pen 1010 (e.g., electronic pen 201) has occurred may be received (1005) by the input framework 1020 through, for example, an electromagnetic sensor disposed close to the display 911. In addition, the input framework 1020 may transmit (1007) the occurrence of the S-pen event to the air command 1040 that performs the motion input function and the hover input function to perform a hover input function matching the received S-pen event. For example, in a case in which an operation of transmitting (1007) occurrence of a S-pen event is performed, as described above with reference to FIG. 9, the motion sensor value received from the electronic pen 201 may be received together with the approach indicator, and accordingly, the received motion sensor value may be ignored and the motion input function may not be performed. For example, a threshold value for the number of approach indicators may be set to, for example, '0' as a criterion for determining not to perform a motion input function, and in this case, a motion event received after a hover event occurs may be ignored.

An electronic device (e.g., the electronic pen 201 of FIG. 2 or FIG. 4) according to various embodiments may include a motion sensor (e.g., the sensor circuit 299 of FIG. 2), an electromagnetic sensor (e.g., the resonance circuit 287 of FIG. 2), a wireless communication circuit (e.g., the communication circuit 290 of FIG. 2), and a processor (e.g., the processor 220 of FIG. 2) operatively coupled with the motion sensor, the electromagnetic sensor, and the wireless communication circuit, and the processor may be configured to receive a motion sensor value from the motion sensor, generate an approach indicator if a sensor signal greater than or equal to a specified threshold value is received through the electromagnetic sensor at a time of receiving the motion sensor value, and transmit the approach indicator along with the motion sensor value to an external electronic device through the wireless communication circuit.

According to an embodiment, the processor may be configured to transmit the motion sensor value not accompanied by the approach indicator to the external electronic device if a sensor signal greater than or equal to a specified threshold is not received from the electromagnetic sensor.

According to an embodiment, the processor may be configured to connect with the external electronic device using a communication protocol designated through the wireless communication circuit, and transmit the motion sensor values based on the communication protocol.

According to an embodiment, the processor may be configured to transmit a signal triggering transmission of the motion sensor values to the external electronic device.

According to an embodiment, a button (e.g., the button 901 of FIG. 9) for generating the trigger signal may be additionally included.

According to an embodiment, a sensor signal of the electromagnetic sensor is received as the electronic device approaches the external electronic device or other electronic device.

Figure 11:
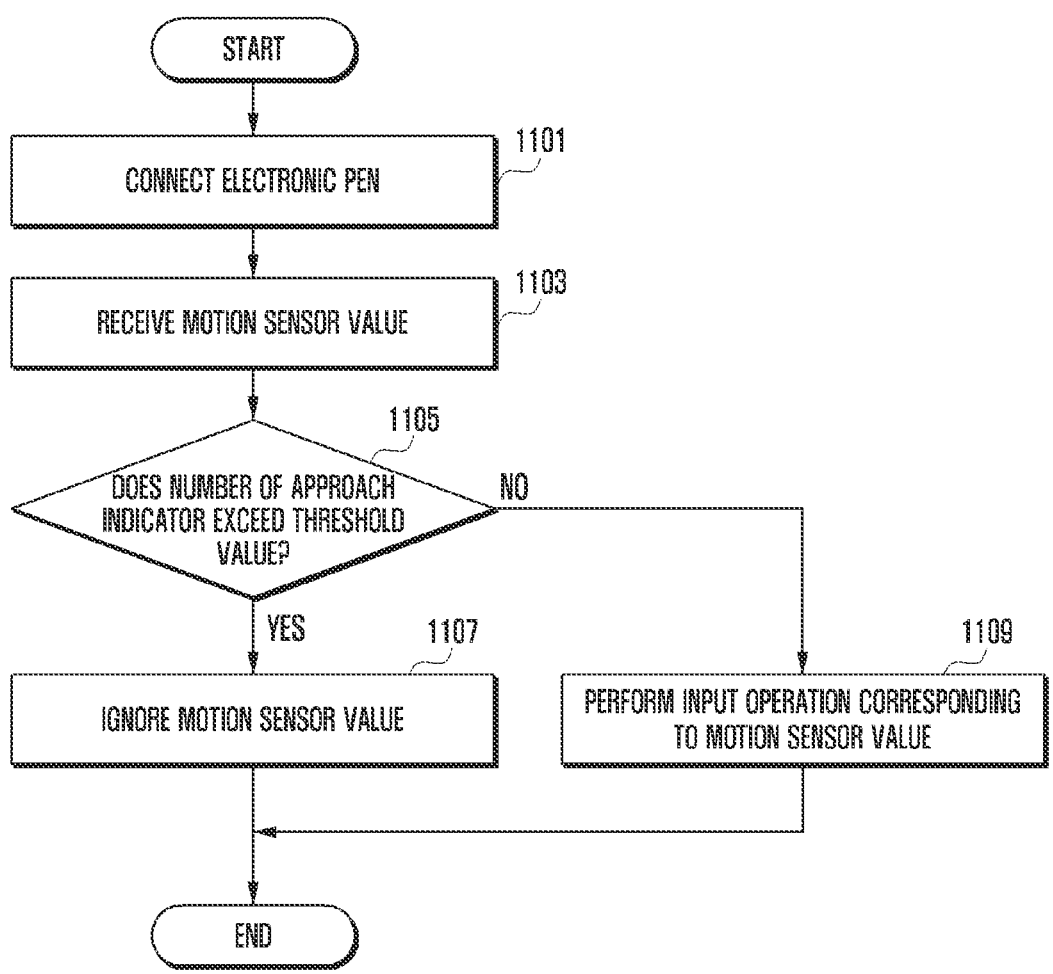
FIG. 11 is a flowchart illustrating an example of an operation of controlling an input of an electronic pen to an electronic device according to various embodiments.

FIG. 11 is a flowchart illustrating an example of an operation of controlling an input to at least one electronic device (e.g., the electronic device 101 of FIG. 1 or FIG. 3, the electronic device 610, 620, 630, 640 and/or 650 of FIG. 6, or the first electronic device 710 of FIG. 7A or 7B, or the electronic device 810 of FIG. 8A or 8B) of an electronic pen (e.g., the electronic pen 201 of FIG. 2) according to various embodiments.

According to various embodiments, the electronic device may be connected to the electronic pen through the near field wireless communication in operation 1101. For example, the electronic device may communicate with the electronic pen using Bluetooth or Bluetooth low energy technology (BLE), but is not limited thereto, and the near field wireless communication may be performed according to various protocols.

According to an embodiment, the electronic device may receive a motion sensor value from the electronic pen in operation 1103. The motion sensor value may include, for example, a signal value output from a gyro sensor, a geomagnetic sensor and/or an acceleration sensor of a motion sensor (e.g., the sensor circuit 299 of FIG. 2 or the sensor 450 of FIG. 4) of the electronic pen.

According to an embodiment, in operation 1105, the electronic device may determine whether the number of approach indicators received together with the received motion sensor value exceeds a threshold value.

According to an embodiment, the approach indicator may be output from the electronic pen based on a sensor signal obtained by an electromagnetic sensor of the electronic pen as the electronic pen approaches an electromagnetic sensor of the electronic device or another electronic device. For example, in a case in which the electronic pen moves close to the display of the electronic device or another electronic device (e.g., the second electronic device 720 of FIG. 7B), the processor of the electronic pen may generate an approach indicator when the output value of the electromagnetic sensor is greater than or equal to a specified threshold value according to the proximity of the electronic pen.

According to an embodiment, the processor of the electronic pen may transmit an approach indicator generated according to movement in proximity to the display of the electronic device or another electronic device to the electronic device through the near field wireless communication together with a motion sensor value obtained through the motion sensor.

According to an embodiment, in a case in which the electronic pen moves in a state that is not close to the display of the electronic device or another electronic device, the processor of the electronic pen may transmit only the motion sensor value obtained through the motion sensor according to movement to the electronic device without generating an approach indicator as the output value of the electromagnetic sensor according to the proximity of the electronic pen being less than a specified threshold value.

According to an embodiment, if the number of approach indicators exceeds a threshold value, in operation 1107, the electronic device may ignore or discard the received motion sensor value. Accordingly, the motion input function may not be performed.

According to an embodiment, if the number of approach indicators is equal to or less than the threshold value, in operation 1109, the electronic device may perform a motion input operation corresponding to the received motion sensor value.

Figure 12:
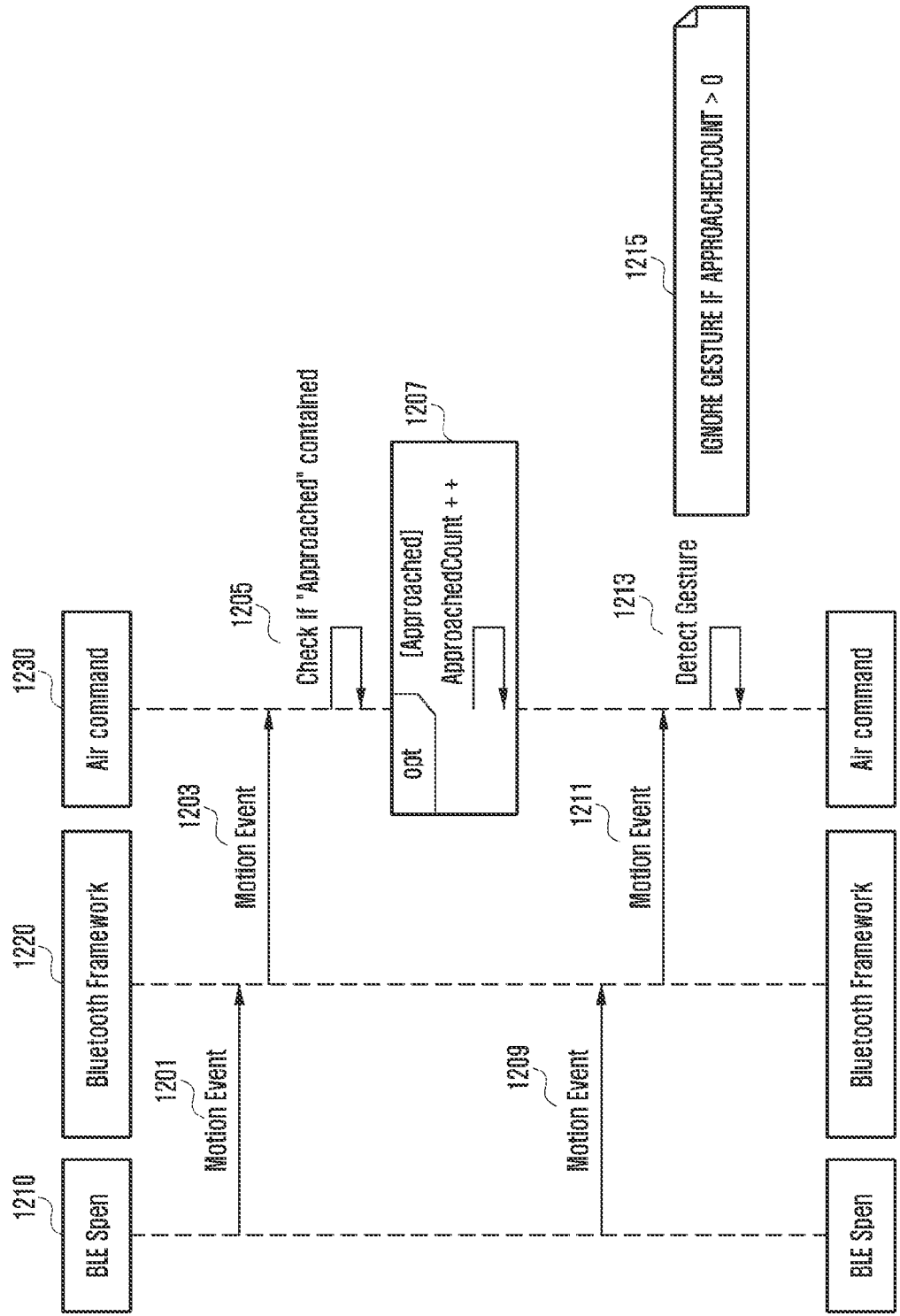
FIG. 12 is a signal flowchart illustrating an example of an operation of controlling an input of an electronic pen according to various embodiments.

FIG. 12 is a signal flowchart illustrating an example operation of controlling an input to at least one electronic device (e.g., the electronic device 101 of FIG. 1 or FIG. 3, the electronic device 610, 620, 630, 640 and/or 650 of FIG. 6, or the first electronic device 710 of FIG. 7A or 7B, or the electronic device 810 of FIG. 8A or 8B) of an electronic pen (e.g., the electronic pen 201 of FIG. 2) according to various embodiments.

Referring to FIG. 12, the BLE S-pen 1210 may transmit (1201) a signal indicating that a motion event (e.g., transmission according to the output of the motion sensor value) has occurred to the Bluetooth framework 1220 of the electronic device 910 through near field wireless communication, for example, a BLE link, The Bluetooth framework 1220 of the electronic device transmits (1203) the received motion event to the air command 1230 that performs a motion input function and a hover input function to check 1205 whether the received motion event includes an approach indicator.

According to an embodiment, if the motion event includes the approach indicator, the air command 1230 may count the approach indicator in operation 1207.

Thereafter, a signal indicating that a motion event occurs may be repeatedly transmitted (1209) from the BLE S-pen 1210 of the electronic pen to the Bluetooth framework 1220 of the electronic device through the near field wireless communication link and transmitted (1211) to the air command 1230. The air command 1230 may detect (1213) a gesture corresponding to the accumulated motion event. In this case, when the approach indicator count exceeds a threshold value (e.g., 0), the gesture is ignored (1215), and motion input according to the gesture may not be performed.

Figure 13:
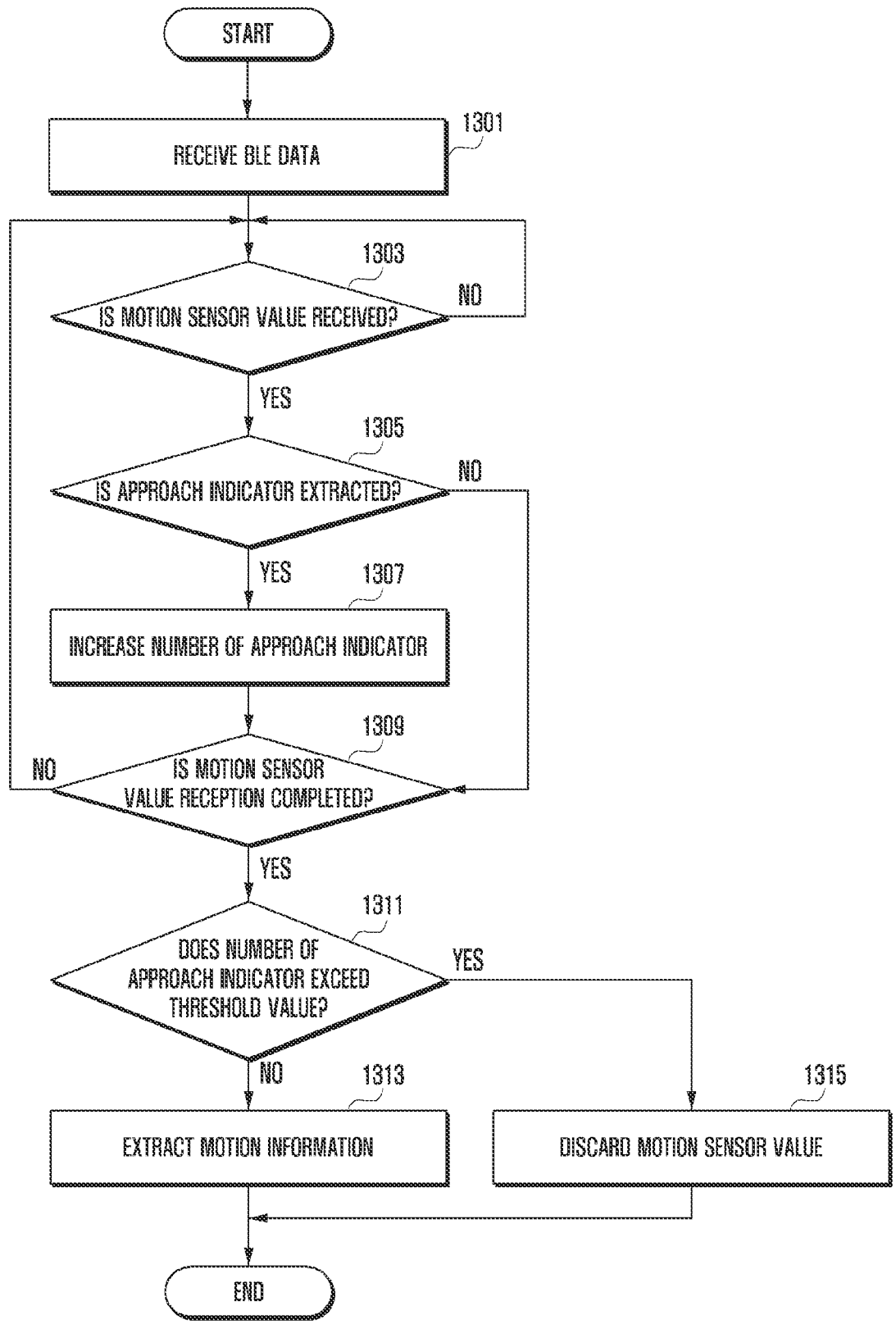
FIG. 13 is a flowchart illustrating an example of an operation of controlling an input of an electronic pen according to various embodiments.

FIG. 13 is a flowchart illustrating an example of an operation of controlling an input of an electronic pen (e.g., the electronic pen 201 of FIG. 2) according to various embodiments.

FIG. 13 is a flowchart illustrating an example of an operation of controlling an input to at least one electronic device (e.g., the electronic device 101 of FIG. 1 or FIG. 3, the electronic device 610, 620, 630, 640 and/or 650 of FIG. 6, or the first electronic device 710 of FIG. 7A or 7B, or the electronic device 810 of FIG. 8A or 8B) of an electronic pen (e.g., the electronic pen 201 of FIG. 2) according to various embodiments.

According to various embodiments, the electronic device may be connected to the electronic pen through near field wireless communication to receive data in operation 1301. For example, the electronic device may communicate with the electronic pen using Bluetooth or Bluetooth low energy technology (BLE) to receive BLE data according to the communication connection, but is not limited thereto, and near field wireless communication may be performed according to various protocols.

According to an embodiment, the electronic device may receive a motion sensor value from the electronic pen in operation 1303 (Yes). The motion sensor value may be received by being included in, for example, a BLE packet, and may include, for example, a signal value output from a gyro sensor, a geomagnetic sensor and/or an acceleration sensor of a motion sensor (e.g., the sensor circuit 299 of FIG. 2 or the sensor 450 of FIG. 4) of the electronic pen.

According to an embodiment, in operation 1305, the electronic device may determine whether the approach indicator is detected from a packet including the received motion sensor value.

According to an embodiment, the approach indicator may be generated from the processor of the electronic pen based on a sensor signal obtained by an electromagnetic sensor of the electronic pen in case in which the electronic pen approaches an electromagnetic sensor of the electronic device or another electronic device. As the electronic pen moves close to the display of the electronic device or other electronic device, the processor of the electronic pen may generate an approach indicator when the motion sensor value of the motion sensor and the output value of the electromagnetic sensor exceed a specified threshold value, and may include the generated proximity indicator in the packet together with the motion sensor value and transmit the packet to the electronic device. As the electronic pen moves away from the display of the electronic device or other electronic device, the processor of the electronic pen may acquire only the motion sensor value of the motion sensor and transmit the motion sensor value to the electronic device by including the motion sensor value in a packet without an approach indicator when the output value of the electromagnetic sensor is less than a specified threshold.

According to an embodiment, when the approach indicator is detected, the electronic device may increase the number by counting the approach indicator in operation 1307.

According to an embodiment, the electronic device may determine whether the reception of the motion sensor value has been completed in operation 1309, and if the reception of the motion sensor value has not been completed, the electronic device may return to operation 1303 to determine whether the motion sensor value is received.

According to an embodiment, when reception of the motion sensor value is completed in operation 1309, the electronic device may determine whether the number of approach indicators counted in operation 1311 exceeds a threshold value.

According to an embodiment, if the number of approach indicators is equal to or less than the threshold value, in operation 1313, the electronic device detects motion information from the received motion sensor values, and may perform a motion input operation corresponding to the received motion sensor values.

According to an embodiment, if the number of approach indicators exceeds a threshold value, in operation 1315, the electronic device may ignore or discard the received motion sensor values. Accordingly, the motion input function may not be performed.

A method of an electronic device (e.g., the electronic device 101 of FIG. 1, 3, or 4) according to various embodiments may include receiving motion sensor values from an external electronic device (e.g., the electronic pen 201 of FIG. 2 or FIG. 4), determining whether a threshold value is exceeded by counting the number of approach indicators received along with the motion sensor values, and discarding the received motion sensor values if the number exceeds a threshold value.

According to various embodiments, extracting motion information from the motion sensor values if the number is less than or equal to the threshold value, and controlling the electronic device to perform an operation of executing a function of the electronic device in response to the motion information may be included.

According to various embodiments, a mapped operation may be performed in response to the motion information among functions of the display according to the input operation.

According to various embodiments, the approach indicator may indicate that the motion sensor value transmitted along with the approach indicator is generated at a time point when the external electronic device approaches a display of the electronic device or another electronic device.

According to various embodiments, connecting to the external electronic device using a designated communication protocol may be additionally included, and the receiving operation may receive the motion sensor values based on the communication protocol.

According to various embodiments, receiving a signal triggering reception of the motion sensor values may be additionally included.

According to various embodiments, the receiving operation may be performed in response to receiving the trigger signal.

While the disclosure has been illustrated and described with reference to various example embodiments, it will be understood that the various example embodiments are intended to be illustrative, not limiting. It will be further understood to those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display;
    a wireless communication circuit; and
    at least one processor operatively coupled with the display and the wireless communication circuit, wherein one or more of the at least one processor is configured to:
        receive motion event information from an external electronic device through the wireless communication circuit, the motion event information comprising motion sensor values, wherein the motion sensor values are generated by a motion sensor of the external electronic device,
        count a number of approach indicators accompanying the motion sensor values for a specified time, wherein each of the approach indicators is generated by an electromagnetic sensor of the external electronic device for moving in proximity to the electronic device or another electronic device at a time when each of the motion sensor values is generated,
        based on the counted number of approach indicators being less than a threshold value, perform a function of the electronic device according to the motion sensor values received during the specified time, and
        based on the counted number of approach indicators being greater than or equal to the threshold value, discard the motion sensor values received during the specified time.

2. The electronic device of claim 1, wherein the motion sensor values received during the specified time are mapped to one of a plurality of functions of the display.

3. The electronic device of claim 1, wherein one or more of the at least one processor is configured to connect to the external electronic device using a communication protocol designated through the wireless communication circuit, and receive the motion event information based on the communication protocol.

4. The electronic device of claim 1, wherein one or more of the at least one processor is configured to receive the motion event information through the wireless communication circuit based on receiving a signal triggering receiving of the motion event information.

5. The electronic device of claim 1, further comprising an electromagnetic sensor, wherein one or more of the at least one processor is configured to control the external electronic device to perform an input function of the display based on a sensor signal received from the electromagnetic sensor as the external electronic device approaches the display.

6. A method of an electronic device, the method comprising:
    receiving motion event information from an external electronic device through a wireless communication circuit, the motion event information comprising motion sensor values, wherein the motion sensor values are generated by a motion sensor of the external electronic device;
    counting a number of approach indicators accompanying the motion sensor values for a specified time, wherein each of the approach indicators is generated by an electromagnetic sensor of the external electronic device for moving in proximity to the electronic device or another electronic device at a time when each of the motion sensor values is generated;
    based on the counted number of approach indicators being less than a threshold value, performing a function of the electronic device according to the motion sensor values received during the specified time; and
    based on the counted number of approach indicators being greater than or equal to the threshold value, discarding the motion sensor values received during the specified time.

7. The method of claim 6, wherein the motion sensor values received during the specified time are mapped to one of a plurality of functions of a display.

8. The method of claim 6, further comprising connecting to the external electronic device using a designated communication protocol, wherein the receiving comprises receiving the motion event information based on the communication protocol.

9. The method of claim 6, further comprising receiving a signal for triggering receiving of the motion event information.

10. The method of claim 9, wherein the receiving is performed based on receiving the trigger signal.

11. An electronic device comprising:
    a motion sensor;
    an electromagnetic sensor;
    a wireless communication circuit; and
    at least one processor operatively coupled with the motion sensor, the electromagnetic sensor, and the wireless communication circuit, wherein one or more of the at least one processor is configured to:

receive a motion sensor value from the motion sensor, receive an electromagnetic sensor value of the electromagnetic sensor at a time when the motion sensor value is received;

based on the electromagnetic sensor value, identify whether the electronic device or another electronic device is in proximity of the electronic device at the time when the motion sensor value is generated;

generate an approach indicator based on the identification that the electronic device is in proximity of the electronic device at the time when the motion sensor value is generated, and transmit motion event information comprising the motion sensor value and the approach indicator to an external electronic device through the wireless communication circuit.

12. The electronic device of claim 11, wherein one or more of the at least one processor is configured to transmit a motion sensor value without an approach indicator, based on the identification that the electronic device is not in proximity of the electronic device at the time when the motion sensor value is generated.

13. The electronic device of claim 11, wherein one or more of the at least one processor is configured to connect with the external electronic device using a communication protocol designated through the wireless communication circuit, and transmit the motion event information based on the communication protocol.

14. The electronic device of claim 11, wherein one or more of the at least one processor is configured to transmit a signal for triggering the transmitting of the motion event information to the external electronic device.

15. The electronic device of claim 14, further comprising a button for generating the trigger signal.

* * * * *